United States Patent
Shapira et al.

(10) Patent No.: US 8,897,215 B2
(45) Date of Patent: Nov. 25, 2014

(54) COMMUNICATION SYSTEM USING CABLES CARRYING ETHERNET SIGNALS

(75) Inventors: Isaac Shapira, Petach Tikva (IL); Ofer Saban, Moshav Kidron (IL); Ami Hazani, Raanana (IL)

(73) Assignee: Corning Optical Communications Wireless Ltd, Airport (IL)

( * ) Notice: Subject to any disclaimer, the term of this patent is extended or adjusted under 35 U.S.C. 154(b) by 997 days.

(21) Appl. No.: 12/674,680

(22) PCT Filed: Feb. 7, 2010

(86) PCT No.: PCT/IB2010/050541
§ 371 (c)(1),
(2), (4) Date: Feb. 23, 2010

(87) PCT Pub. No.: WO2010/089719
PCT Pub. Date: Aug. 12, 2010

(65) Prior Publication Data
US 2011/0170476 A1  Jul. 14, 2011

Related U.S. Application Data

(60) Provisional application No. 61/150,764, filed on Feb. 8, 2009.

(51) Int. Cl.
*H04W 4/00* (2009.01)
*H04L 12/413* (2006.01)

(52) U.S. Cl.
CPC .................................. *H04L 12/413* (2013.01)
USPC .......................................... 370/328; 370/338

(58) Field of Classification Search
USPC ................................................ 370/328, 338
See application file for complete search history.

(56) References Cited

U.S. PATENT DOCUMENTS

| | | | |
|---|---|---|---|
| 2,092,709 | A | 9/1937 | Wheeler |
| 2,298,435 | A | 10/1942 | Tunick |

(Continued)

FOREIGN PATENT DOCUMENTS

| | | |
|---|---|---|
| CN | 1430848 A | 7/2003 |
| CN | 101547447 B | 12/2010 |

(Continued)

OTHER PUBLICATIONS

European Search Report issued Apr. 6, 2011 for European Patent Application No. 10182929.9, 7 pages.

(Continued)

*Primary Examiner* — Noel Beharry
*Assistant Examiner* — Farhad Ali

(57) ABSTRACT

It is provided a method for transmitting a wireless signal on Ethernet wiring The wireless signal is received in a hub unit for delivery to a remote unit In the hub unit the wireless signal is down converted to a down-converted frequency band for propagation on the Ethernet wiring A reference signal associated with a local oscillator used for the down conversion is embedded on a synchronous Ethernet stream that may include Ethernet data received at hub unit The synchronous Ethernet stream and the down converted wireless signal are submitted through the Ethernet wiring to the remote unit. The synchronous Ethernet stream may include data for management of electronic circuits installed in the remote unit, as well as a synchronization signal used thereof A converted replica of the first signal may be included in digital form in frames of the synchronous Ethernet stream.

11 Claims, 8 Drawing Sheets

(56) References Cited

U.S. PATENT DOCUMENTS

| | | |
|---|---|---|
| 2,411,786 A | 11/1946 | Halstead |
| 2,568,342 A | 9/1951 | Koehler et al. |
| 2,613,285 A | 10/1952 | Fromm |
| 2,671,850 A | 3/1954 | Marcou |
| 2,747,083 A | 5/1956 | Guanella |
| 2,964,623 A | 12/1960 | Bell |
| 2,986,723 A | 5/1961 | Darwin et al. |
| 3,072,899 A | 1/1963 | Kleist et al. |
| 3,274,339 A | 9/1966 | Herry et al. |
| 3,406,344 A | 10/1968 | Hopper |
| 3,511,936 A | 5/1970 | Saltzberg |
| 3,529,088 A | 9/1970 | Hauer |
| 3,651,471 A | 3/1972 | Haselwood et al. |
| 3,656,112 A | 4/1972 | Paull |
| 3,699,250 A | 10/1972 | Bunting |
| 3,723,653 A | 3/1973 | Tatsuzawa |
| 3,872,253 A | 3/1975 | Jurschak |
| 3,873,771 A | 3/1975 | Kleinerman et al. |
| 3,875,339 A | 4/1975 | Gruen et al. |
| 3,937,889 A | 2/1976 | Bell, III et al. |
| 3,992,589 A | 11/1976 | Kuegler |
| 4,008,369 A | 2/1977 | Theurer et al. |
| 4,013,840 A | 3/1977 | Anderson |
| 4,035,838 A | 7/1977 | Bassani et al. |
| 4,049,914 A | 9/1977 | Anderson et al. |
| 4,054,910 A | 10/1977 | Chou et al. |
| 4,063,173 A | 12/1977 | Nelson et al. |
| 4,171,467 A | 10/1979 | Evenchik |
| 4,186,347 A | 1/1980 | Frosch et al. |
| 4,199,761 A | 4/1980 | Whyte et al. |
| 4,200,862 A | 4/1980 | Campbell et al. |
| 4,205,270 A | 5/1980 | Okatani et al. |
| 4,206,320 A | 6/1980 | Keasler et al. |
| 4,302,629 A | 11/1981 | Foulkes et al. |
| 4,328,579 A | 5/1982 | Hashimoto et al. |
| 4,332,980 A | 6/1982 | Reynolds et al. |
| 4,339,816 A | 7/1982 | Reed |
| 4,378,470 A | 3/1983 | Murto et al. |
| 4,387,271 A | 6/1983 | Artom |
| 4,388,489 A | 6/1983 | Wigan et al. |
| 4,393,508 A | 7/1983 | Boudault |
| 4,417,279 A | 11/1983 | Shinkawa et al. |
| 4,425,642 A | 1/1984 | Moses et al. |
| 4,433,212 A | 2/1984 | Moses et al. |
| 4,442,320 A | 4/1984 | James et al. |
| 4,442,540 A | 4/1984 | Allen |
| 4,443,662 A | 4/1984 | Nakhla |
| 4,449,218 A | 5/1984 | Strehl |
| 4,449,246 A | 5/1984 | Seiler et al. |
| 4,456,925 A | 6/1984 | Skerlos et al. |
| 4,456,985 A | 6/1984 | Carsten et al. |
| 4,456,986 A | 6/1984 | Carsten et al. |
| 4,459,434 A | 7/1984 | Benning et al. |
| 4,462,113 A | 7/1984 | Iwata |
| 4,467,140 A | 8/1984 | Fathauer et al. |
| 4,468,538 A | 8/1984 | Cripps |
| 4,476,574 A | 10/1984 | Struven |
| 4,485,400 A | 11/1984 | Lemelson et al. |
| 4,493,948 A | 1/1985 | Sues et al. |
| 4,500,751 A | 2/1985 | Darland et al. |
| 4,500,976 A | 2/1985 | DuBroff |
| 4,506,387 A | 3/1985 | Walter |
| 4,509,211 A | 4/1985 | Robbins |
| 4,521,881 A | 6/1985 | Stapleford et al. |
| 4,528,422 A | 7/1985 | Cupani |
| 4,528,519 A | 7/1985 | van Driest |
| 4,546,212 A | 10/1985 | Crowder, Sr. |
| 4,556,988 A | 12/1985 | Yoshisato |
| 4,561,020 A | 12/1985 | Matsuda |
| 4,564,940 A | 1/1986 | Yahata |
| 4,577,311 A | 3/1986 | Duquesne et al. |
| 4,577,314 A | 3/1986 | Chu et al. |
| 4,578,535 A | 3/1986 | Simmons |
| 4,578,540 A | 3/1986 | Borg et al. |
| 4,580,291 A | 4/1986 | ab der Halden |
| 4,584,690 A | 4/1986 | Cafiero et al. |
| 4,597,077 A | 6/1986 | Nelson et al. |
| 4,604,741 A | 8/1986 | Barsellotti |
| 4,608,686 A | 8/1986 | Barsellotti |
| 4,644,526 A | 2/1987 | Wu |
| 4,646,289 A | 2/1987 | Tsiakas et al. |
| 4,646,296 A | 2/1987 | Bartholet et al. |
| 4,649,551 A | 3/1987 | Sander et al. |
| 4,656,655 A | 4/1987 | Hashimoto |
| 4,665,516 A | 5/1987 | Middleton et al. |
| 4,670,870 A | 6/1987 | Hewinson et al. |
| 4,670,874 A | 6/1987 | Sato et al. |
| 4,672,602 A | 6/1987 | Hargrave et al. |
| 4,672,605 A | 6/1987 | Hustig et al. |
| 4,679,227 A | 7/1987 | Hughes-Hartogs |
| 4,706,274 A | 11/1987 | Baker et al. |
| 4,709,412 A | 11/1987 | Seymour et al. |
| 4,718,108 A | 1/1988 | Davidson et al. |
| 4,731,821 A | 3/1988 | Jackson, III |
| 4,746,809 A | 5/1988 | Coleman et al. |
| 4,754,326 A | 6/1988 | Kram et al. |
| 4,755,792 A | 7/1988 | Pezzolo et al. |
| 4,757,495 A | 7/1988 | Decker et al. |
| 4,757,497 A | 7/1988 | Beierle et al. |
| 4,764,922 A | 8/1988 | Dieter et al. |
| 4,766,402 A | 8/1988 | Crane |
| 4,768,110 A | 8/1988 | Dunlap et al. |
| 4,768,206 A | 8/1988 | Van Gerwen |
| 4,769,837 A | 9/1988 | McCormick et al. |
| 4,776,006 A | 10/1988 | Comerford et al. |
| 4,777,652 A | 10/1988 | Stolarczyk |
| 4,780,757 A | 10/1988 | Bryer et al. |
| 4,780,758 A | 10/1988 | Lin et al. |
| 4,785,448 A | 11/1988 | Reichert et al. |
| 4,785,472 A | 11/1988 | Shapiro |
| 4,789,895 A | 12/1988 | Mustafa et al. |
| 4,789,994 A | 12/1988 | Randall et al. |
| 4,799,213 A | 1/1989 | Fitzgerald |
| 4,807,225 A | 2/1989 | Fitch |
| 4,821,319 A | 4/1989 | Middleton et al. |
| 4,825,435 A | 4/1989 | Amundsen et al. |
| 4,837,799 A | 6/1989 | Prohs et al. |
| 4,839,743 A | 6/1989 | Best et al. |
| 4,849,811 A | 7/1989 | Kleinerman |
| 4,850,009 A | 7/1989 | Zook et al. |
| 4,856,085 A | 8/1989 | Horvat |
| 4,864,588 A | 9/1989 | Simpson et al. |
| 4,866,733 A | 9/1989 | Morishita |
| 4,866,757 A | 9/1989 | Nilssen |
| 4,882,747 A | 11/1989 | Williams |
| 4,885,747 A | 12/1989 | Foglia |
| 4,885,766 A | 12/1989 | Yasuoka et al. |
| 4,885,803 A | 12/1989 | Hermann et al. |
| 4,888,795 A | 12/1989 | Ando et al. |
| 4,890,316 A | 12/1989 | Walsh et al. |
| 4,893,326 A | 1/1990 | Duran et al. |
| 4,901,342 A | 2/1990 | Jones |
| 4,901,368 A | 2/1990 | Arnold et al. |
| 4,916,460 A | 4/1990 | Powell |
| 4,918,688 A | 4/1990 | Krause et al. |
| 4,918,690 A | 4/1990 | Markkula, Jr. et al. |
| 4,924,492 A | 5/1990 | Gitlin et al. |
| 4,932,022 A | 6/1990 | Keeney et al. |
| 4,932,047 A | 6/1990 | Emmons et al. |
| 4,941,200 A | 7/1990 | Leslie et al. |
| 4,941,207 A | 7/1990 | Maeda et al. |
| 4,945,404 A | 7/1990 | Miller |
| 4,947,483 A | 8/1990 | Dirr |
| 4,949,187 A | 8/1990 | Cohen |
| 4,953,160 A | 8/1990 | Gupta |
| 4,954,886 A | 9/1990 | Elberbaum |
| 4,955,048 A | 9/1990 | Iwamura et al. |
| 4,959,862 A | 9/1990 | Davidov et al. |
| 4,969,136 A | 11/1990 | Chamberlin et al. |
| 4,972,505 A | 11/1990 | Isberg |
| 4,975,896 A | 12/1990 | D'Agosto, III et al. |
| 4,975,906 A | 12/1990 | Takiyasu et al. |
| 4,979,028 A | 12/1990 | Minematsu et al. |
| 4,980,665 A | 12/1990 | Schotz |

(56) References Cited

U.S. PATENT DOCUMENTS

| | | |
|---|---|---|
| 4,985,892 A | 1/1991 | Camarata |
| 4,989,081 A | 1/1991 | Miyagawa et al. |
| 4,996,709 A | 2/1991 | Heep et al. |
| 4,999,613 A | 3/1991 | Williamson et al. |
| 5,010,399 A | 4/1991 | Goodman et al. |
| 5,036,513 A | 7/1991 | Greenblatt |
| 5,045,948 A | 9/1991 | Streck et al. |
| 5,046,135 A | 9/1991 | Hatcher |
| 5,051,822 A | 9/1991 | Rhoades |
| 5,068,890 A | 11/1991 | Nilssen |
| 5,089,886 A | 2/1992 | Grandmougin |
| 5,090,052 A | 2/1992 | Nakajima et al. |
| 5,095,497 A | 3/1992 | Aman et al. |
| 5,109,222 A | 4/1992 | Welty et al. |
| 5,109,532 A | 4/1992 | Petrovic et al. |
| 5,115,463 A | 5/1992 | Moldavsky et al. |
| 5,142,397 A | 8/1992 | Dockery |
| 5,161,021 A | 11/1992 | Tsai |
| 5,187,803 A | 2/1993 | Sohner et al. |
| 5,187,806 A | 2/1993 | Johnson et al. |
| 5,206,655 A | 4/1993 | Caille et al. |
| 5,210,788 A | 5/1993 | Nilssen |
| 5,230,086 A | 7/1993 | Saul |
| 5,247,347 A | 9/1993 | Litteral et al. |
| 5,251,053 A | 10/1993 | Heidemann |
| 5,255,268 A | 10/1993 | Cato et al. |
| 5,257,006 A | 10/1993 | Graham et al. |
| 5,265,150 A | 11/1993 | Helmkamp et al. |
| 5,283,637 A | 2/1994 | Goolcharan |
| 5,297,203 A | 3/1994 | Rose et al. |
| 5,321,736 A | 6/1994 | Beasley |
| 5,321,846 A | 6/1994 | Yokota et al. |
| 5,339,184 A | 8/1994 | Tang |
| 5,353,334 A | 10/1994 | O'Sullivan |
| 5,361,407 A | 11/1994 | Sawada et al. |
| 5,363,432 A | 11/1994 | Martin et al. |
| 5,379,005 A | 1/1995 | Aden et al. |
| 5,404,570 A | 4/1995 | Charas et al. |
| 5,408,260 A | 4/1995 | Arnon |
| 5,410,343 A | 4/1995 | Coddington et al. |
| 5,428,836 A | 6/1995 | Sanecki et al. |
| 5,432,838 A | 7/1995 | Purchase et al. |
| 5,452,289 A | 9/1995 | Sharma et al. |
| 5,457,557 A | 10/1995 | Zarem et al. |
| 5,463,616 A | 10/1995 | Kruse et al. |
| 5,469,495 A | 11/1995 | Beveridge |
| 5,481,249 A | 1/1996 | Sato |
| 5,489,894 A | 2/1996 | Murray |
| 5,502,446 A | 3/1996 | Denninger |
| 5,537,637 A | 7/1996 | Sugita et al. |
| 5,539,821 A | 7/1996 | Blonder |
| 5,548,592 A | 8/1996 | Komarek et al. |
| 5,550,836 A | 8/1996 | Albrecht et al. |
| 5,550,898 A | 8/1996 | Abbasi et al. |
| 5,551,057 A | 8/1996 | Mitra |
| 5,553,063 A | 9/1996 | Dickson |
| 5,565,855 A | 10/1996 | Knibbe |
| 5,572,575 A | 11/1996 | Yamamoto et al. |
| 5,574,964 A | 11/1996 | Hamlin |
| 5,579,221 A | 11/1996 | Mun |
| 5,587,692 A | 12/1996 | Graham et al. |
| 5,600,333 A | 2/1997 | Justice et al. |
| 5,603,080 A | 2/1997 | Kallander et al. |
| 5,610,916 A | 3/1997 | Kostreski et al. |
| 5,619,251 A | 4/1997 | Kuroiwa et al. |
| 5,619,505 A | 4/1997 | Grube et al. |
| 5,621,455 A | 4/1997 | Rogers et al. |
| 5,625,863 A | 4/1997 | Abraham |
| 5,627,879 A | 5/1997 | Russell et al. |
| 5,628,055 A | 5/1997 | Stein |
| 5,634,191 A | 5/1997 | Beasley |
| 5,642,405 A | 6/1997 | Fischer et al. |
| 5,644,622 A | 7/1997 | Russell et al. |
| 5,646,983 A | 7/1997 | Suffern et al. |
| 5,657,358 A | 8/1997 | Panech et al. |
| 5,657,374 A | 8/1997 | Russell et al. |
| 5,675,375 A | 10/1997 | Riffee |
| 5,694,232 A | 12/1997 | Parsay et al. |
| 5,696,790 A | 12/1997 | Graham et al. |
| 5,696,861 A | 12/1997 | Schimmeyer et al. |
| 5,708,705 A | 1/1998 | Yamashita et al. |
| 5,708,961 A | 1/1998 | Hylton et al. |
| 5,722,076 A | 2/1998 | Sakabe et al. |
| 5,726,984 A | 3/1998 | Kubler et al. |
| 5,734,678 A | 3/1998 | Paneth et al. |
| 5,736,965 A | 4/1998 | Mosebrook et al. |
| 5,748,104 A | 5/1998 | Argyroudis et al. |
| 5,757,803 A | 5/1998 | Russell et al. |
| 5,758,294 A | 5/1998 | Ganesan et al. |
| 5,765,099 A | 6/1998 | Georges et al. |
| 5,774,789 A | 6/1998 | van der Kaay et al. |
| 5,778,303 A | 7/1998 | Shinozaki et al. |
| 5,787,115 A | 7/1998 | Turnbull et al. |
| 5,790,536 A | 8/1998 | Mahany et al. |
| 5,802,283 A | 9/1998 | Grady et al. |
| 5,809,395 A | 9/1998 | Hamilton-Piercy et al. |
| 5,812,184 A | 9/1998 | Martinez |
| 5,812,786 A | 9/1998 | Seazholtz et al. |
| 5,815,086 A | 9/1998 | Ivie et al. |
| 5,822,678 A | 10/1998 | Evanyk |
| 5,828,663 A | 10/1998 | Ikegami |
| 5,832,364 A | 11/1998 | Gustafson |
| 5,832,365 A | 11/1998 | Chen et al. |
| 5,835,863 A | 11/1998 | Ikenouchi et al. |
| 5,838,226 A | 11/1998 | Houggy et al. |
| 5,841,360 A | 11/1998 | Binder |
| 5,841,840 A | 11/1998 | Smith et al. |
| 5,841,841 A | 11/1998 | Dodds et al. |
| 5,848,054 A | 12/1998 | Mosebrook et al. |
| 5,848,150 A | 12/1998 | Bingel |
| 5,864,284 A | 1/1999 | Sanderson |
| 5,878,047 A | 3/1999 | Ganek et al. |
| 5,896,443 A | 4/1999 | Dichter |
| 5,896,569 A | 4/1999 | Butler et al. |
| 5,901,340 A | 5/1999 | Flickinger et al. |
| 5,905,442 A | 5/1999 | Mosebrook et al. |
| 5,910,776 A | 6/1999 | Black |
| 5,912,895 A | 6/1999 | Terry et al. |
| 5,926,531 A | 7/1999 | Petite |
| 5,929,896 A | 7/1999 | Goodman et al. |
| 5,930,340 A | 7/1999 | Bell |
| 5,930,682 A | 7/1999 | Schwartz et al. |
| 5,930,719 A | 7/1999 | Babitch et al. |
| 5,936,660 A | 8/1999 | Gurantz |
| 5,937,342 A | 8/1999 | Kline |
| 5,937,348 A | 8/1999 | Cina et al. |
| 5,940,400 A | 8/1999 | Eastmond et al. |
| 5,949,476 A | 9/1999 | Pocock et al. |
| 5,950,149 A | 9/1999 | Fieramosca et al. |
| 5,953,670 A | 9/1999 | Newson |
| 5,960,066 A | 9/1999 | Hartmann et al. |
| 5,963,539 A | 10/1999 | Webber, Jr. et al. |
| 5,963,595 A | 10/1999 | Graham et al. |
| 5,977,913 A | 11/1999 | Christ |
| 5,982,363 A | 11/1999 | Naiff |
| 5,982,784 A | 11/1999 | Bell |
| 5,982,854 A | 11/1999 | Ehreth |
| 5,983,070 A | 11/1999 | Georges et al. |
| 5,986,574 A | 11/1999 | Colton |
| 5,987,303 A | 11/1999 | Dutta et al. |
| 5,994,998 A | 11/1999 | Fisher et al. |
| 5,995,593 A | 11/1999 | Cho |
| 5,995,598 A | 11/1999 | Berstis |
| 6,002,722 A | 12/1999 | Wu |
| 6,005,873 A | 12/1999 | Amit |
| 6,005,884 A | 12/1999 | Cook et al. |
| 6,014,546 A | 1/2000 | Georges et al. |
| 6,026,150 A | 2/2000 | Frank et al. |
| 6,032,057 A | 2/2000 | Kiiski |
| 6,038,425 A | 3/2000 | Jeffrey |
| 6,040,759 A | 3/2000 | Sanderson |
| 6,049,705 A | 4/2000 | Xue |
| 6,052,380 A | 4/2000 | Bell |
| 6,061,357 A | 5/2000 | Olshansky et al. |

(56) References Cited

U.S. PATENT DOCUMENTS

| | | | |
|---|---|---|---|
| 6,061,392 A | 5/2000 | Bremer et al. |
| 6,069,588 A | 5/2000 | O'Neill, Jr. |
| 6,069,899 A | 5/2000 | Foley |
| 6,087,860 A | 7/2000 | Liu et al. |
| 6,088,368 A | 7/2000 | Rubinstain et al. |
| 6,094,441 A | 7/2000 | Jung et al. |
| 6,101,341 A | 8/2000 | Manabe |
| 6,108,331 A | 8/2000 | Thompson |
| 6,115,755 A | 9/2000 | Krishan |
| 6,128,470 A | 10/2000 | Naidu et al. |
| 6,130,893 A | 10/2000 | Whittaker et al. |
| 6,130,896 A | 10/2000 | Lueker et al. |
| 6,137,865 A | 10/2000 | Ripy et al. |
| 6,141,356 A | 10/2000 | Gorman |
| 6,151,480 A | 11/2000 | Fischer et al. |
| 6,157,810 A | 12/2000 | Georges et al. |
| 6,175,860 B1 | 1/2001 | Gaucher |
| 6,192,399 B1 | 2/2001 | Goodman |
| 6,198,432 B1 | 3/2001 | Janky |
| 6,202,211 B1 | 3/2001 | Williams, Jr. |
| 6,212,227 B1 | 4/2001 | Ko et al. |
| 6,215,789 B1 | 4/2001 | Keenan et al. |
| 6,216,160 B1 | 4/2001 | Dichter |
| 6,218,931 B1 | 4/2001 | Asghar et al. |
| 6,222,503 B1 | 4/2001 | Gietema et al. |
| 6,240,166 B1 | 5/2001 | Collin et al. |
| 6,243,413 B1 | 6/2001 | Beukema |
| 6,243,571 B1 | 6/2001 | Bullock et al. |
| 6,249,671 B1 | 6/2001 | Tucker et al. |
| 6,256,296 B1 | 7/2001 | Ruziak et al. |
| 6,292,467 B1 | 9/2001 | Keller |
| 6,292,517 B1 | 9/2001 | Jeffress et al. |
| 6,310,894 B1 | 10/2001 | Counterman |
| 6,317,599 B1 | 11/2001 | Rappaport et al. |
| 6,317,884 B1 | 11/2001 | Eames et al. |
| 6,320,900 B1 | 11/2001 | Liu |
| 6,324,268 B1 | 11/2001 | Balachandran et al. |
| 6,330,244 B1 | 12/2001 | Swartz et al. |
| 6,346,875 B1 | 2/2002 | Puckette et al. |
| 6,349,133 B1 | 2/2002 | Matthews et al. |
| 6,353,599 B1 | 3/2002 | Bi et al. |
| 6,370,149 B1 | 4/2002 | Gorman et al. |
| 6,389,010 B1 | 5/2002 | Kubler et al. |
| 6,389,125 B1 | 5/2002 | Ubowski |
| 6,392,349 B1 | 5/2002 | Crenshaw |
| 6,393,050 B1 | 5/2002 | Liu |
| 6,397,288 B1 | 5/2002 | Rye et al. |
| 6,400,815 B1 | 6/2002 | Gilboy et al. |
| 6,400,957 B1 | 6/2002 | Rodrigues et al. |
| 6,414,952 B2 | 7/2002 | Foley |
| 6,424,661 B1 | 7/2002 | Bentley |
| 6,427,237 B1 | 7/2002 | Aranguren et al. |
| 6,430,199 B1 | 8/2002 | Kerpez |
| 6,434,123 B1 | 8/2002 | Park |
| 6,438,109 B1 | 8/2002 | Karaoguz et al. |
| 6,449,318 B1 | 9/2002 | Rumbaugh |
| 6,452,910 B1 | 9/2002 | Vij et al. |
| 6,452,915 B1 | 9/2002 | Jorgensen |
| 6,452,923 B1 | 9/2002 | Gerszberg et al. |
| 6,470,053 B1 | 10/2002 | Liu |
| 6,473,495 B1 | 10/2002 | Willer |
| 6,473,609 B1 | 10/2002 | Schwartz et al. |
| 6,480,510 B1 | 11/2002 | Binder |
| 6,483,470 B1 | 11/2002 | Hohnstein et al. |
| 6,483,902 B1 | 11/2002 | Stewart et al. |
| 6,492,897 B1 | 12/2002 | Mowery, Jr. |
| 6,493,875 B1 | 12/2002 | Eames et al. |
| 6,501,942 B1 | 12/2002 | Weissman et al. |
| 6,513,163 B1 | 1/2003 | Silvia et al. |
| 6,522,662 B1 | 2/2003 | Liu |
| 6,522,728 B1 | 2/2003 | Willer |
| 6,522,730 B1 | 2/2003 | Timm et al. |
| 6,522,731 B2 | 2/2003 | Matsumoto |
| 6,526,581 B1 | 2/2003 | Edson |
| 6,532,279 B1 | 3/2003 | Goodman |
| 6,532,280 B1 | 3/2003 | McDonald |
| 6,535,110 B1 | 3/2003 | Arora et al. |
| 6,535,587 B1 | 3/2003 | Kobayashi |
| 6,539,011 B1 | 3/2003 | Keenan et al. |
| 6,546,098 B1 | 4/2003 | Henderson |
| 6,549,616 B1 | 4/2003 | Binder |
| 6,556,581 B1 | 4/2003 | He et al. |
| 6,560,319 B1 | 5/2003 | Binder |
| 6,563,418 B1 | 5/2003 | Moon |
| 6,563,816 B1 | 5/2003 | Nodoushani et al. |
| 6,567,981 B1 | 5/2003 | Jeffrey |
| 6,570,890 B1 | 5/2003 | Keenan et al. |
| 6,572,384 B1 | 6/2003 | Marchevsky |
| 6,573,826 B2 | 6/2003 | Pan |
| 6,574,242 B1 | 6/2003 | Keenan et al. |
| 6,577,231 B2 | 6/2003 | Litwin, Jr. et al. |
| 6,577,631 B1 | 6/2003 | Keenan et al. |
| 6,580,402 B2 | 6/2003 | Navarro et al. |
| 6,580,710 B1 | 6/2003 | Bowen et al. |
| 6,580,728 B1 | 6/2003 | Cook et al. |
| 6,580,785 B2 | 6/2003 | Bremer et al. |
| 6,583,719 B2 | 6/2003 | Okada et al. |
| 6,587,473 B2 | 7/2003 | Terry et al. |
| 6,587,479 B1 | 7/2003 | Bianchi et al. |
| 6,587,739 B1 | 7/2003 | Abrams et al. |
| 6,603,808 B1 | 8/2003 | Anne et al. |
| 6,615,074 B2 | 9/2003 | Mickle et al. |
| 6,618,578 B1 | 9/2003 | Petite |
| 6,622,304 B1 | 9/2003 | Carhart |
| 6,650,871 B1 | 11/2003 | Cannon et al. |
| 6,653,932 B1 | 11/2003 | Beamish et al. |
| 6,654,616 B1 | 11/2003 | Pope, Jr. et al. |
| 6,657,535 B1 | 12/2003 | Magbie et al. |
| 6,658,269 B1 | 12/2003 | Golemon et al. |
| 6,668,328 B1 | 12/2003 | Bell |
| 6,670,930 B2 | 12/2003 | Navarro |
| 6,678,321 B1 | 1/2004 | Graham et al. |
| 6,678,721 B1 | 1/2004 | Bell |
| 6,683,531 B2 | 1/2004 | Diamanti et al. |
| 6,690,677 B1 | 2/2004 | Binder |
| 6,693,916 B1 | 2/2004 | Chaplik et al. |
| 6,697,358 B2 | 2/2004 | Bernstein |
| 6,701,137 B1 | 3/2004 | Judd et al. |
| 6,701,406 B1 | 3/2004 | Chang et al. |
| 6,710,721 B1 | 3/2004 | Holowick |
| 6,711,138 B1 | 3/2004 | Pai et al. |
| 6,721,365 B1 | 4/2004 | Yin et al. |
| 6,721,419 B1 | 4/2004 | Stell et al. |
| 6,721,790 B1 | 4/2004 | Chen |
| 6,725,059 B1 | 4/2004 | Bell |
| 6,731,945 B2 | 5/2004 | Do et al. |
| 6,732,315 B2 | 5/2004 | Yagil et al. |
| 6,735,217 B1 | 5/2004 | Webber, Jr. et al. |
| 6,737,984 B1 | 5/2004 | Welles, II et al. |
| 6,738,382 B1 | 5/2004 | West et al. |
| 6,738,597 B1 | 5/2004 | Jeung et al. |
| 6,738,641 B1 | 5/2004 | Elsasser |
| 6,748,080 B2 | 6/2004 | Russ et al. |
| 6,751,441 B1 | 6/2004 | Murray et al. |
| 6,754,186 B1 | 6/2004 | Bullman |
| 6,759,946 B2 | 7/2004 | Sahinoglu et al. |
| 6,760,601 B1 | 7/2004 | Suoknuuti et al. |
| 6,763,097 B1 | 7/2004 | Vitenberg |
| 6,763,226 B1 | 7/2004 | McZeal, Jr. |
| 6,771,164 B1 | 8/2004 | Fink |
| 6,771,750 B1 | 8/2004 | Nayler et al. |
| 6,771,773 B1 | 8/2004 | Hanrieder et al. |
| 6,771,774 B1 | 8/2004 | Phan et al. |
| 6,773,632 B1 | 8/2004 | Marshall et al. |
| 6,778,549 B1 | 8/2004 | Keller |
| 6,778,646 B1 | 8/2004 | Sun |
| 6,778,817 B1 | 8/2004 | Bullock et al. |
| 6,781,530 B2 | 8/2004 | Moore |
| 6,782,048 B2 | 8/2004 | Santhoff |
| 6,785,296 B1 | 8/2004 | Bell |
| 6,785,558 B1 | 8/2004 | Stratford et al. |
| 6,807,463 B1 | 10/2004 | Cunningham et al. |
| 6,819,760 B1 | 11/2004 | Nayler |
| 6,822,946 B1 | 11/2004 | Wallace |

(56) References Cited

U.S. PATENT DOCUMENTS

| | | |
|---|---|---|
| 6,826,163 B2 | 11/2004 | Mani et al. |
| 6,826,164 B2 | 11/2004 | Mani et al. |
| 6,826,174 B1 | 11/2004 | Erekson et al. |
| 6,831,921 B2 | 12/2004 | Higgins |
| 6,831,975 B1 | 12/2004 | Easwaran et al. |
| 6,836,546 B1 | 12/2004 | Willer |
| 6,839,345 B2 | 1/2005 | Lu et al. |
| 6,842,433 B2 | 1/2005 | West et al. |
| 6,842,459 B1 | 1/2005 | Binder |
| 6,844,809 B2 | 1/2005 | Manis et al. |
| 6,850,510 B2 | 2/2005 | Kubler et al. |
| 6,857,132 B1 | 2/2005 | Rakib et al. |
| 6,862,349 B1 | 3/2005 | Beveridge |
| 6,862,353 B2 | 3/2005 | Rabenko et al. |
| 6,865,193 B2 | 3/2005 | Terk |
| 6,868,072 B1 | 3/2005 | Lin et al. |
| 6,876,056 B2 | 4/2005 | Tilmans et al. |
| 6,885,674 B2 | 4/2005 | Hunt et al. |
| 6,895,249 B2 | 5/2005 | Gaal |
| 6,901,439 B1 | 5/2005 | Bonasia et al. |
| 6,904,134 B2 | 6/2005 | Jeon et al. |
| 6,909,725 B1 | 6/2005 | Chow |
| 6,914,539 B2 | 7/2005 | Hoctor et al. |
| 6,919,858 B2 | 7/2005 | Rofougaran |
| 6,922,407 B2 | 7/2005 | Wu |
| 6,925,089 B2 | 8/2005 | Chow et al. |
| 6,931,659 B1 | 8/2005 | Kinemura |
| 6,933,835 B2 | 8/2005 | Kline |
| 6,934,754 B2 | 8/2005 | West et al. |
| 6,937,056 B2 | 8/2005 | Binder |
| 6,941,364 B2 | 9/2005 | Kim et al. |
| 6,941,576 B2 | 9/2005 | Amit |
| 6,947,408 B1 * | 9/2005 | Liberti et al. ............... 370/345 |
| 6,947,736 B2 | 9/2005 | Shaver et al. |
| 6,950,567 B2 | 9/2005 | Kline |
| 6,961,303 B1 | 11/2005 | Binder |
| 6,961,312 B2 | 11/2005 | Kubler et al. |
| 6,961,763 B1 | 11/2005 | Wang et al. |
| 6,963,559 B2 | 11/2005 | Elo |
| 6,963,936 B2 | 11/2005 | Billington et al. |
| 6,965,302 B2 | 11/2005 | Mollenkopf et al. |
| 6,980,089 B1 | 12/2005 | Kline |
| 6,985,072 B2 | 1/2006 | Omidi et al. |
| 6,985,714 B2 | 1/2006 | Akiyama et al. |
| 6,987,988 B2 | 1/2006 | Uchiyama |
| 6,989,733 B2 | 1/2006 | Simonsen et al. |
| 6,993,317 B2 | 1/2006 | Belsak, Jr. |
| 6,995,657 B2 | 2/2006 | Zalitzky et al. |
| 6,996,213 B1 | 2/2006 | De Jong |
| 6,996,837 B1 | 2/2006 | Miura et al. |
| 6,998,964 B2 | 2/2006 | Lomax, Jr. et al. |
| 7,003,102 B2 | 2/2006 | Kiko |
| 7,006,006 B2 | 2/2006 | Witkow et al. |
| 7,009,527 B2 | 3/2006 | Seo |
| 7,009,946 B1 | 3/2006 | Kardach |
| 7,015,797 B2 | 3/2006 | Kaylor et al. |
| 7,015,826 B1 | 3/2006 | Chan et al. |
| 7,016,377 B1 | 3/2006 | Chun et al. |
| 7,023,382 B1 | 4/2006 | Akano |
| 7,024,166 B2 | 4/2006 | Wallace et al. |
| 7,027,416 B1 | 4/2006 | Kriz |
| 7,027,483 B2 | 4/2006 | Santhoff et al. |
| 7,027,770 B2 | 4/2006 | Judd et al. |
| 7,035,270 B2 | 4/2006 | Moore, Jr. et al. |
| 7,046,716 B1 | 5/2006 | Miao |
| 7,050,017 B2 | 5/2006 | King et al. |
| 7,053,838 B2 | 5/2006 | Judd |
| 7,054,303 B2 | 5/2006 | Miyazaki et al. |
| 7,064,654 B2 | 6/2006 | Berkman et al. |
| 7,088,238 B2 | 8/2006 | Karaoguz et al. |
| 7,095,849 B2 | 8/2006 | Smith et al. |
| 7,099,368 B2 | 8/2006 | Santhoff et al. |
| 7,099,621 B1 | 8/2006 | Chadwick |
| 7,103,240 B2 | 9/2006 | Kline |
| 7,103,377 B2 | 9/2006 | Bauman et al. |
| 7,106,721 B1 | 9/2006 | Binder |
| 7,113,134 B1 | 9/2006 | Berkman |
| 7,113,574 B1 | 9/2006 | Haas et al. |
| 7,113,763 B2 | 9/2006 | Heinonen et al. |
| 7,117,520 B2 | 10/2006 | Stewart |
| 7,123,939 B1 | 10/2006 | Bird et al. |
| 7,127,175 B2 | 10/2006 | Mani et al. |
| 7,133,729 B1 | 11/2006 | Wang et al. |
| 7,142,535 B2 | 11/2006 | Kubler et al. |
| 7,142,560 B2 | 11/2006 | Mansfield |
| 7,142,563 B1 | 11/2006 | Lin |
| 7,149,474 B1 | 12/2006 | Mikhak |
| 7,151,575 B1 | 12/2006 | Landry et al. |
| 7,154,996 B2 | 12/2006 | Strauss |
| 7,155,214 B2 | 12/2006 | Struthers et al. |
| 7,164,886 B2 | 1/2007 | Mowery et al. |
| 7,167,078 B2 | 1/2007 | Pourchot |
| 7,167,525 B2 | 1/2007 | Santhoff et al. |
| 7,167,923 B2 | 1/2007 | Lo |
| 7,171,244 B2 | 1/2007 | Bauman |
| 7,181,023 B2 | 2/2007 | Andrews et al. |
| 7,194,251 B2 | 3/2007 | Rubinstein et al. |
| 7,199,443 B2 | 4/2007 | Elsharawy |
| 7,209,719 B2 | 4/2007 | Liebenow |
| 7,209,945 B2 | 4/2007 | Hicks, III et al. |
| 7,257,106 B2 | 8/2007 | Chen et al. |
| 7,257,108 B2 | 8/2007 | Cheston et al. |
| 7,266,344 B2 | 9/2007 | Rodriguez |
| 7,269,311 B2 | 9/2007 | Kim et al. |
| 7,292,859 B2 | 11/2007 | Park |
| 7,299,287 B1 | 11/2007 | Rubinstein et al. |
| 7,315,735 B2 | 1/2008 | Graham |
| 7,317,793 B2 | 1/2008 | Binder et al. |
| 7,321,316 B2 | 1/2008 | Hancock et al. |
| 7,359,449 B2 | 4/2008 | Feher |
| 7,359,674 B2 | 4/2008 | Markki et al. |
| 7,366,151 B2 | 4/2008 | Kubler et al. |
| 7,369,526 B2 | 5/2008 | Lechleider et al. |
| 7,412,224 B2 | 8/2008 | Kotola et al. |
| 7,451,365 B2 | 11/2008 | Wang et al. |
| 7,460,507 B2 | 12/2008 | Kubler et al. |
| 7,469,105 B2 | 12/2008 | Wake et al. |
| 7,508,785 B2 | 3/2009 | Dale et al. |
| 7,539,509 B2 | 5/2009 | Bauman et al. |
| 7,542,452 B2 | 6/2009 | Penumetsa |
| 7,546,138 B2 | 6/2009 | Bauman |
| 7,548,695 B2 | 6/2009 | Wake |
| 7,551,641 B2 | 6/2009 | Pirzada et al. |
| 7,557,758 B2 | 7/2009 | Rofougaran |
| 7,580,384 B2 | 8/2009 | Kubler et al. |
| 7,586,861 B2 | 9/2009 | Kubler et al. |
| 7,599,420 B2 | 10/2009 | Forenza et al. |
| 7,630,690 B2 | 12/2009 | Kaewell, Jr. et al. |
| 7,633,934 B2 | 12/2009 | Kubler et al. |
| 7,639,982 B2 | 12/2009 | Wala |
| 7,646,743 B2 | 1/2010 | Kubler et al. |
| 7,646,777 B2 | 1/2010 | Hicks, III et al. |
| 7,653,397 B2 | 1/2010 | Pernu et al. |
| 7,668,565 B2 | 2/2010 | Ylänen et al. |
| 7,688,811 B2 | 3/2010 | Kubler et al. |
| 7,693,486 B2 | 4/2010 | Kasslin et al. |
| 7,697,467 B2 | 4/2010 | Kubler et al. |
| 7,715,375 B2 | 5/2010 | Kubler et al. |
| 7,720,510 B2 | 5/2010 | Pescod et al. |
| 7,751,374 B2 | 7/2010 | Donovan |
| 7,751,838 B2 | 7/2010 | Ramesh et al. |
| 7,760,703 B2 | 7/2010 | Kubler et al. |
| 7,761,093 B2 | 7/2010 | Sabat, Jr. et al. |
| 7,768,951 B2 | 8/2010 | Kubler et al. |
| 7,773,573 B2 | 8/2010 | Chung et al. |
| 7,778,603 B2 | 8/2010 | Palin et al. |
| 7,805,073 B2 | 9/2010 | Sabat, Jr. et al. |
| 7,809,012 B2 | 10/2010 | Ruuska et al. |
| 7,813,451 B2 | 10/2010 | Binder et al. |
| 7,817,969 B2 | 10/2010 | Castaneda et al. |
| 7,835,328 B2 | 11/2010 | Stephens et al. |
| 7,848,316 B2 | 12/2010 | Kubler et al. |
| 7,853,234 B2 | 12/2010 | Afsahi |
| 7,870,321 B2 | 1/2011 | Rofougaran |

(56) References Cited

U.S. PATENT DOCUMENTS

| | | |
|---|---|---|
| 7,881,755 B1 | 2/2011 | Mishra et al. |
| 7,894,423 B2 | 2/2011 | Kubler et al. |
| 7,899,007 B2 | 3/2011 | Kubler et al. |
| 7,907,972 B2 | 3/2011 | Walton et al. |
| 7,912,043 B2 | 3/2011 | Kubler et al. |
| 7,916,706 B2 | 3/2011 | Kubler et al. |
| 7,917,177 B2 | 3/2011 | Bauman |
| 7,920,553 B2 | 4/2011 | Kubler et al. |
| 7,920,858 B2 | 4/2011 | Sabat, Jr. et al. |
| 7,924,783 B1 | 4/2011 | Mahany et al. |
| 7,936,713 B2 | 5/2011 | Kubler et al. |
| 7,949,364 B2 | 5/2011 | Kasslin et al. |
| 7,957,777 B1 | 6/2011 | Vu et al. |
| 7,969,009 B2 | 6/2011 | Chandrasekaran |
| 7,969,911 B2 | 6/2011 | Mahany et al. |
| 7,990,925 B2 | 8/2011 | Tinnakornsrisuphap et al. |
| 7,996,020 B1 | 8/2011 | Chhabra |
| 8,018,907 B2 | 9/2011 | Kubler et al. |
| 8,036,308 B2 | 10/2011 | Rofougaran |
| 8,082,353 B2 | 12/2011 | Huber et al. |
| 8,086,192 B2 | 12/2011 | Rofougaran et al. |
| 2001/0040472 A1 | 11/2001 | Suga et al. |
| 2002/0003873 A1 | 1/2002 | Rabenko et al. |
| 2002/0006137 A1 | 1/2002 | Rabenko et al. |
| 2002/0011923 A1 | 1/2002 | Cunningham et al. |
| 2002/0019966 A1 | 2/2002 | Yagil et al. |
| 2002/0034220 A1 | 3/2002 | Duxbury |
| 2002/0035624 A1 | 3/2002 | Kim |
| 2002/0037004 A1 | 3/2002 | Bossemeyer et al. |
| 2002/0038459 A1 | 3/2002 | Talmola et al. |
| 2002/0039388 A1 | 4/2002 | Smart et al. |
| 2002/0049036 A1 | 4/2002 | Bullock et al. |
| 2002/0052188 A1* | 5/2002 | Behbahani ............... 455/402 |
| 2002/0060617 A1 | 5/2002 | Walbeck et al. |
| 2002/0061012 A1 | 5/2002 | Thi et al. |
| 2002/0061763 A1 | 5/2002 | Weissman |
| 2002/0075806 A1 | 6/2002 | Shalvi et al. |
| 2002/0103012 A1 | 8/2002 | Kim et al. |
| 2002/0123365 A1 | 9/2002 | Thorson et al. |
| 2002/0128009 A1 | 9/2002 | Boch et al. |
| 2002/0128043 A1 | 9/2002 | Chandler |
| 2002/0144159 A1 | 10/2002 | Wu et al. |
| 2002/0146207 A1 | 10/2002 | Chu |
| 2002/0166124 A1 | 11/2002 | Gurantz et al. |
| 2002/0176567 A1 | 11/2002 | Chen et al. |
| 2002/0186836 A1 | 12/2002 | Leuca et al. |
| 2002/0194383 A1 | 12/2002 | Cohen et al. |
| 2002/0198952 A1 | 12/2002 | Bell |
| 2003/0006881 A1 | 1/2003 | Reyes |
| 2003/0012158 A1 | 1/2003 | Jin et al. ............... 370/335 |
| 2003/0016418 A1 | 1/2003 | Westbrook et al. |
| 2003/0016794 A1 | 1/2003 | Brothers |
| 2003/0018975 A1 | 1/2003 | Stone |
| 2003/0031191 A1 | 2/2003 | El Wardani et al. |
| 2003/0062990 A1 | 4/2003 | Schaeffer, Jr. et al. |
| 2003/0067910 A1 | 4/2003 | Razazian et al. |
| 2003/0068033 A1 | 4/2003 | Kiko |
| 2003/0099228 A1 | 5/2003 | Alcock |
| 2003/0100288 A1 | 5/2003 | Tomlinson, Jr. et al. |
| 2003/0100330 A1 | 5/2003 | Tomlinson, Jr. et al. |
| 2003/0106067 A1 | 6/2003 | Hoskins et al. |
| 2003/0112965 A1 | 6/2003 | McNamara et al. |
| 2003/0139151 A1 | 7/2003 | Lifshitz et al. |
| 2003/0169752 A1 | 9/2003 | Chen et al. |
| 2003/0179868 A1 | 9/2003 | Binder |
| 2003/0224728 A1 | 12/2003 | Heinonen et al. |
| 2004/0017785 A1 | 1/2004 | Zelst |
| 2004/0032373 A1 | 2/2004 | Petros et al. |
| 2004/0073597 A1 | 4/2004 | Caveney et al. |
| 2004/0077310 A1 | 4/2004 | Levy |
| 2004/0083262 A1 | 4/2004 | Trantow |
| 2004/0085976 A1 | 5/2004 | Dale et al. |
| 2004/0090984 A1 | 5/2004 | Saint-Hilaire et al. |
| 2004/0100930 A1 | 5/2004 | Shapira et al. |
| 2004/0102196 A1 | 5/2004 | Weckstrom et al. |
| 2004/0106435 A1 | 6/2004 | Bauman et al. |
| 2004/0107299 A1 | 6/2004 | Lee et al. |
| 2004/0123322 A1 | 6/2004 | Erkocevic et al. |
| 2004/0125870 A1 | 7/2004 | Yamazaki |
| 2004/0131357 A1 | 7/2004 | Farmer et al. |
| 2004/0136388 A1 | 7/2004 | Schaff |
| 2004/0146020 A1 | 7/2004 | Kubler et al. |
| 2004/0151164 A1 | 8/2004 | Kubler et al. |
| 2004/0151305 A1 | 8/2004 | Binder et al. |
| 2004/0158649 A1 | 8/2004 | Ophir et al. |
| 2004/0160912 A1 | 8/2004 | Kubler et al. |
| 2004/0160913 A1 | 8/2004 | Kubler et al. |
| 2004/0162117 A1 | 8/2004 | Liebenow |
| 2004/0165573 A1 | 8/2004 | Kubler et al. |
| 2004/0187156 A1 | 9/2004 | Palm et al. |
| 2004/0192285 A1 | 9/2004 | Capobianco et al. |
| 2004/0198236 A1 | 10/2004 | Paine et al. |
| 2004/0201457 A1 | 10/2004 | O'Toole et al. |
| 2004/0203387 A1 | 10/2004 | Grannan |
| 2004/0204040 A1 | 10/2004 | Heijnen |
| 2004/0208167 A1 | 10/2004 | Kishida |
| 2004/0208599 A1 | 10/2004 | Swartz et al. |
| 2004/0213351 A1 | 10/2004 | Shattil |
| 2004/0235468 A1 | 11/2004 | Luebke et al. |
| 2004/0248531 A1 | 12/2004 | Takaki |
| 2004/0255332 A1 | 12/2004 | Bertonis et al. |
| 2004/0259538 A1 | 12/2004 | Agbegnenou |
| 2004/0264087 A1 | 12/2004 | Bishop |
| 2004/0268160 A1 | 12/2004 | Atkinson et al. |
| 2005/0010954 A1 | 1/2005 | Binder |
| 2005/0018648 A1 | 1/2005 | Scheelke |
| 2005/0018857 A1 | 1/2005 | McCarty et al. |
| 2005/0024945 A1 | 2/2005 | Forbes |
| 2005/0034159 A1 | 2/2005 | Ophir et al. |
| 2005/0038875 A1 | 2/2005 | Park |
| 2005/0047379 A1 | 3/2005 | Boyden et al. |
| 2005/0073968 A1 | 4/2005 | Perlman |
| 2005/0076149 A1 | 4/2005 | McKown et al. |
| 2005/0076151 A1 | 4/2005 | Tapperson et al. |
| 2005/0076375 A1 | 4/2005 | Nakamura |
| 2005/0084004 A1 | 4/2005 | Bione |
| 2005/0086694 A1 | 4/2005 | Hicks et al. |
| 2005/0089061 A1 | 4/2005 | Logvinov et al. |
| 2005/0114325 A1 | 5/2005 | Liu et al. |
| 2005/0117545 A1 | 6/2005 | Wittwer et al. |
| 2005/0136972 A1 | 6/2005 | Smith et al. |
| 2005/0144647 A1 | 6/2005 | Zussman et al. |
| 2005/0147067 A1 | 7/2005 | Mani et al. |
| 2005/0147071 A1 | 7/2005 | Karaoguz et al. |
| 2005/0152337 A1 | 7/2005 | Wurtzel et al. |
| 2005/0164666 A1 | 7/2005 | Lang et al. |
| 2005/0180561 A1 | 8/2005 | Hazani et al. |
| 2005/0181839 A1 | 8/2005 | Tiainen et al. |
| 2005/0184915 A1 | 8/2005 | Nagel et al. |
| 2005/0201323 A1 | 9/2005 | Mani et al. |
| 2005/0226200 A1 | 10/2005 | Askildsen et al. |
| 2005/0226206 A1 | 10/2005 | An |
| 2005/0239400 A1 | 10/2005 | Narikawa |
| 2005/0265428 A1 | 12/2005 | McCorkle |
| 2005/0265430 A1* | 12/2005 | Ozluturk et al. ............... 375/145 |
| 2005/0268322 A1 | 12/2005 | Watson |
| 2005/0280598 A1 | 12/2005 | Webb et al. |
| 2006/0007945 A1 | 1/2006 | Schoettle et al. |
| 2006/0018328 A1 | 1/2006 | Mody et al. |
| 2006/0045524 A1 | 3/2006 | Lee et al. |
| 2006/0045525 A1 | 3/2006 | Lee et al. |
| 2006/0056283 A1 | 3/2006 | Anikhindi et al. |
| 2006/0066455 A1 | 3/2006 | Hancock et al. |
| 2006/0072684 A1 | 4/2006 | Feher |
| 2006/0098620 A1 | 5/2006 | Zhou et al. |
| 2006/0126617 A1 | 6/2006 | Cregg et al. |
| 2006/0128425 A1 | 6/2006 | Rooyen |
| 2006/0133465 A1 | 6/2006 | Dockemeyer, Jr. et al. |
| 2006/0152344 A1 | 7/2006 | Mowery, Jr. |
| 2006/0153169 A1 | 7/2006 | Koifman et al. |
| 2006/0172781 A1 | 8/2006 | Mohebbi |
| 2006/0193310 A1 | 8/2006 | Landry et al. |
| 2006/0193313 A1 | 8/2006 | Landry et al. |
| 2006/0210278 A1 | 9/2006 | Cregg et al. |

(56) References Cited

U.S. PATENT DOCUMENTS

| | | |
|---|---|---|
| 2006/0215680 A1 | 9/2006 | Camagna |
| 2006/0220833 A1 | 10/2006 | Berkman |
| 2006/0222086 A1 | 10/2006 | Frye, Jr. |
| 2006/0238250 A1 | 10/2006 | Camagna et al. |
| 2006/0251086 A1 | 11/2006 | Ha et al. |
| 2006/0251094 A1 | 11/2006 | Van Vleck et al. |
| 2006/0251159 A1 | 11/2006 | Huotari et al. |
| 2006/0251179 A1 | 11/2006 | Ghoshal |
| 2006/0262014 A1 | 11/2006 | Shemesh et al. |
| 2006/0274704 A1 | 12/2006 | Desai et al. |
| 2006/0274745 A1 | 12/2006 | Wang et al. |
| 2006/0276227 A1 | 12/2006 | Dravida |
| 2006/0280197 A1 | 12/2006 | Stone |
| 2006/0286958 A1 | 12/2006 | Lee et al. |
| 2006/0291493 A1 | 12/2006 | Schley-May et al. |
| 2007/0002772 A1 | 1/2007 | Berkman et al. |
| 2007/0002876 A1 | 1/2007 | Berkman et al. |
| 2007/0019959 A1 | 1/2007 | Retnasothie et al. |
| 2007/0025368 A1 | 2/2007 | Ha et al. |
| 2007/0047573 A1 | 3/2007 | Logvinov et al. |
| 2007/0054622 A1 | 3/2007 | Berkman |
| 2007/0058666 A1 | 3/2007 | Pratt |
| 2007/0060045 A1 | 3/2007 | Prautzsch |
| 2007/0060055 A1 | 3/2007 | Desai et al. |
| 2007/0076649 A1 | 4/2007 | Lin et al. |
| 2007/0082649 A1 | 4/2007 | Chan |
| 2007/0083668 A1 | 4/2007 | Kelsey et al. |
| 2007/0104168 A1 | 5/2007 | Polson |
| 2007/0112939 A1 | 5/2007 | Wilson et al. |
| 2007/0139188 A1 | 6/2007 | Ollis et al. |
| 2007/0167144 A1 | 7/2007 | Koga et al. |
| 2007/0177495 A1 | 8/2007 | Ametsitsi |
| 2007/0198748 A1 | 8/2007 | Ametsitsi et al. |
| 2007/0206629 A1 | 9/2007 | Choi |
| 2007/0224954 A1 | 9/2007 | Gopi |
| 2007/0254714 A1 | 11/2007 | Martich et al. |
| 2007/0264009 A1 | 11/2007 | Sabat, Jr. et al. |
| 2007/0268846 A1 | 11/2007 | Proctor, Jr. et al. |
| 2007/0268886 A1 | 11/2007 | Caspi et al. |
| 2007/0292143 A1 | 12/2007 | Yu et al. |
| 2007/0297005 A1 | 12/2007 | Montierth et al. |
| 2008/0043714 A1 | 2/2008 | Pernu |
| 2008/0063397 A1 | 3/2008 | Hu et al. |
| 2008/0098203 A1 | 4/2008 | Master et al. |
| 2008/0118014 A1 | 5/2008 | Reunamaki et al. |
| 2008/0129634 A1 | 6/2008 | Pera et al. |
| 2008/0134194 A1 | 6/2008 | Liu |
| 2008/0144493 A1 | 6/2008 | Yeh |
| 2008/0207253 A1 | 8/2008 | Jaakkola et al. |
| 2008/0232305 A1 | 9/2008 | Oren et al. |
| 2008/0253351 A1 | 10/2008 | Pernu et al. |
| 2008/0261656 A1 | 10/2008 | Bella et al. |
| 2008/0268833 A1 | 10/2008 | Huang et al. |
| 2008/0279137 A1 | 11/2008 | Pernu et al. |
| 2008/0280569 A1* | 11/2008 | Hazani et al. ............... 455/74.1 |
| 2008/0291830 A1 | 11/2008 | Pernu et al. |
| 2008/0292322 A1 | 11/2008 | Daghighian et al. |
| 2009/0022304 A1 | 1/2009 | Kubler et al. |
| 2009/0028087 A1 | 1/2009 | Nguyen et al. |
| 2009/0028317 A1 | 1/2009 | Ling et al. |
| 2009/0047023 A1 | 2/2009 | Pescod et al. |
| 2009/0059903 A1 | 3/2009 | Kubler et al. |
| 2009/0061796 A1 | 3/2009 | Arkko et al. |
| 2009/0073916 A1 | 3/2009 | Zhang et al. |
| 2009/0149221 A1 | 6/2009 | Liu et al. |
| 2009/0175214 A1 | 7/2009 | Sfar et al. |
| 2009/0180407 A1 | 7/2009 | Sabat et al. |
| 2009/0180426 A1 | 7/2009 | Sabat et al. |
| 2009/0218407 A1 | 9/2009 | Rofougaran |
| 2009/0218657 A1 | 9/2009 | Rofougaran |
| 2009/0245084 A1 | 10/2009 | Moffatt et al. |
| 2009/0245153 A1 | 10/2009 | Li et al. |
| 2009/0245221 A1 | 10/2009 | Piipponen |
| 2009/0252136 A1 | 10/2009 | Mahany et al. |
| 2009/0252139 A1 | 10/2009 | Ludovico et al. |
| 2009/0252205 A1 | 10/2009 | Rheinfelder et al. |
| 2009/0258652 A1 | 10/2009 | Lambert et al. |
| 2009/0285147 A1 | 11/2009 | Subasic et al. |
| 2009/0316608 A1 | 12/2009 | Singh et al. |
| 2009/0316609 A1 | 12/2009 | Singh |
| 2010/0002626 A1 | 1/2010 | Schmidt et al. |
| 2010/0002661 A1 | 1/2010 | Schmidt et al. |
| 2010/0002662 A1 | 1/2010 | Schmidt et al. |
| 2010/0014494 A1 | 1/2010 | Schmidt et al. |
| 2010/0027443 A1 | 2/2010 | LoGalbo et al. |
| 2010/0056200 A1 | 3/2010 | Tolonen |
| 2010/0074267 A1 | 3/2010 | Ladd |
| 2010/0080154 A1 | 4/2010 | Noh et al. |
| 2010/0080182 A1 | 4/2010 | Kubler et al. |
| 2010/0091475 A1 | 4/2010 | Toms et al. |
| 2010/0118864 A1 | 5/2010 | Kubler et al. |
| 2010/0118894 A1* | 5/2010 | Aweya et al. ............... 370/503 |
| 2010/0127937 A1 | 5/2010 | Chandrasekaran et al. |
| 2010/0134257 A1 | 6/2010 | Puleston et al. |
| 2010/0142955 A1 | 6/2010 | Yu et al. |
| 2010/0148373 A1 | 6/2010 | Chandrasekaran |
| 2010/0156721 A1 | 6/2010 | Alamouti et al. |
| 2010/0188998 A1 | 7/2010 | Pernu et al. |
| 2010/0190509 A1 | 7/2010 | Davis |
| 2010/0202326 A1 | 8/2010 | Rofougaran et al. |
| 2010/0225413 A1 | 9/2010 | Rofougaran et al. |
| 2010/0225556 A1 | 9/2010 | Rofougaran et al. |
| 2010/0225557 A1 | 9/2010 | Rofougaran et al. |
| 2010/0232323 A1 | 9/2010 | Kubler et al. |
| 2010/0246558 A1 | 9/2010 | Harel |
| 2010/0255774 A1 | 10/2010 | Kenington |
| 2010/0258949 A1 | 10/2010 | Henderson et al. |
| 2010/0260063 A1 | 10/2010 | Kubler et al. |
| 2010/0278530 A1 | 11/2010 | Kummetz et al. |
| 2010/0290355 A1 | 11/2010 | Roy et al. |
| 2010/0309049 A1 | 12/2010 | Reunamäki et al. |
| 2010/0311472 A1 | 12/2010 | Rofougaran et al. |
| 2010/0311480 A1 | 12/2010 | Raines et al. |
| 2010/0329161 A1 | 12/2010 | Ylanen et al. |
| 2010/0329166 A1 | 12/2010 | Mahany et al. |
| 2010/0329680 A1 | 12/2010 | Presi et al. |
| 2011/0002687 A1 | 1/2011 | Sabat, Jr. et al. |
| 2011/0007724 A1 | 1/2011 | Mahany et al. |
| 2011/0007733 A1 | 1/2011 | Kubler et al. |
| 2011/0021146 A1 | 1/2011 | Pernu |
| 2011/0021224 A1 | 1/2011 | Koskinen et al. |
| 2011/0026932 A1 | 2/2011 | Yeh et al. |
| 2011/0065450 A1 | 3/2011 | Kazmi |
| 2011/0069668 A1 | 3/2011 | Chion et al. |
| 2011/0071734 A1 | 3/2011 | Van Wiemeersch et al. |
| 2011/0086614 A1 | 4/2011 | Brisebois et al. |
| 2011/0116572 A1 | 5/2011 | Lee et al. |
| 2011/0126071 A1 | 5/2011 | Han et al. |
| 2011/0149879 A1 | 6/2011 | Noriega et al. |
| 2011/0158298 A1 | 6/2011 | Djadi et al. |
| 2011/0182230 A1 | 7/2011 | Ohm et al. |
| 2011/0194475 A1 | 8/2011 | Kim et al. |
| 2011/0201368 A1 | 8/2011 | Faccin et al. |
| 2011/0204504 A1 | 8/2011 | Henderson et al. |
| 2011/0211439 A1 | 9/2011 | Manpuria et al. |
| 2011/0215901 A1 | 9/2011 | Van Wiemeersch et al. |
| 2011/0222415 A1 | 9/2011 | Ramamurthi et al. |
| 2011/0222434 A1 | 9/2011 | Chen |
| 2011/0222619 A1 | 9/2011 | Ramamurthi et al. |
| 2011/0227795 A1 | 9/2011 | Lopez et al. |
| 2011/0244887 A1 | 10/2011 | Dupray et al. |
| 2011/0256878 A1 | 10/2011 | Zhu et al. |
| 2011/0268033 A1 | 11/2011 | Boldi et al. |
| 2011/0274021 A1 | 11/2011 | He et al. |
| 2011/0281536 A1 | 11/2011 | Lee et al. |

FOREIGN PATENT DOCUMENTS

| | | |
|---|---|---|
| DE | 20317501 U1 | 1/2004 |
| EP | 0342858 A2 | 11/1989 |
| EP | 0355328 A2 | 2/1990 |
| EP | 0709974 A1 | 5/1996 |
| EP | 0938204 A1 | 8/1999 |
| EP | 1085684 A2 | 3/2001 |

(56) References Cited

FOREIGN PATENT DOCUMENTS

| | | | |
|---|---|---|---|
| EP | 1331762 A1 | 7/2003 | |
| EP | 1347584 A2 | 9/2003 | |
| EP | 1749399 A1 | 2/2007 | |
| EP | 1954019 A1 | 8/2008 | |
| GB | 2266028 A | 10/1993 | |
| GB | 2313020 A | 11/1997 | |
| JP | 5252559 A | 9/1993 | |
| JP | 5327569 A | 12/1993 | |
| JP | 5327576 A | 12/1993 | |
| WO | 9413067 A1 | 6/1994 | |
| WO | 9603823 A1 | 2/1996 | |
| WO | 9613102 A1 | 5/1996 | |
| WO | 980454 A1 | 1/1998 | |
| WO | 0180543 A2 | 10/2001 | |
| WO | 0225920 A1 | 3/2002 | |
| WO | 02065229 A2 | 8/2002 | |
| WO | 02091618 A1 | 11/2002 | |
| WO | 03024027 A1 | 3/2003 | |
| WO | 2004068827 A1 | 8/2004 | |
| WO | 2004107783 A1 | 12/2004 | |
| WO | 2005022692 A2 | 3/2005 | |
| WO | 2005109845 A1 | 11/2005 | |
| WO | 2006052216 A1 | 5/2006 | |
| WO | 2006105185 A2 | 10/2006 | |
| WO | 2006136811 A1 | 12/2006 | |
| WO | 2007069241 A2 | 6/2007 | |
| WO | 2007133630 A2 | 11/2007 | |
| WO | WO2009/053910 A2 | 4/2009 | ............ H04W 24/04 |
| WO | 2010090999 A1 | 8/2010 | |

OTHER PUBLICATIONS

European Search Report issued Apr. 5, 2011 for European Patent Application No. 10182930.7, 6 pages.
Agere Systems, "WaveLAN™ WL60040 Multimode Wireless LAN Media Access Controller (MAC)", Aug. 2003, pp. 1-10.
Agere Systems, Inc. "WaveLAN™ 802.11a/b/g Chip Set", document from Agere Systems, Feb. 2003, PA, USA, pp. 1-6.
Agere Systems, Inc. "WaveLAN™ WL54040 Dual-Band Wireless LAN Transciever", Sep. 2003, 99, pp. 1-4.
Allen Telecom Group, Inc., "ActiveLite.TM." Antenna, Publication SD-1107, Dec. 1994, 6 pages.
Allen Telecom Group, Inc., MicroFill.RTM, "Systems Engineering Design Guide," Publication SD-1131, Jan. 1995, 12 pages.
Allen Telecom Group, Inc., MicroFill.RTM, "When You Have Customers in High Places," Publication SD-1106, Dec. 1994, 5 pages.
Allen Telecom Group, Inc., "The Secret to MicroLite.RTM's Coverage Success," Publication SD-1115, Jan. 1994, 3 pages.
Avery, John, "Standard Serves In-Building Microcellular PCS," Microwaves & RF, May 1995, pp. 8-12 and 40.
CAL Context Description; Revision SP3485, Rev. Feb. 2, 1996, EIA 600.82, pp. 007651-007667, 17 pages.
Common Application Language (CAL) Specification; Revision SP3484, Rev. Sep. 17, 1996, 007525-007650, EIA 600-81, 77 pages.
Goldberg, Lee, "Broadband to the Home: Challenges on the Last Mile," Electronic Design, Oct. 2, 1995, pp. 67-82.
Goldberg, Lee, "Brains and Bandwidth: Fiber Service at Copper Prices," Electronic Design, Oct. 2, 1995, pp. 51-60.
International Search Report for PCT/US2009/048155 dated Aug. 20, 2009, 10 pages.
Sanchez, et al. "A High-Performance Versatile Residential Gateway", Wireless Communications and Networking Conference, 2000, pp. 560-566.
Agere Systems, Inc. "802.11g Wireless Chip Set Technology White Paper", Mar. 2003, Agere Systems, Inc., pp. 1-12.
Dastangoo, et al., "Wireless LAN Technologies and Applications," MILCOM '93 Conference Record, IEEE, vol. 2, 1993, pp. 497-501.
Unknown, "EIA 600.41, Description of the Data Link Layer," Revision IS-60, Jan. 31, 1996, 60 pages.
Unknown, "Draft IS-60.04 Node Communications Protocol Part 6: Application Layer Specification," Revision Apr. 18, 1996, 129 pages.

Unknown, "EIA 600.10 Introduction to the CEBUS Standard," Revision Feb. 5, 1995, 19 pages.
Unknown, "Ethernet Wireless LAN Systems," BYTE Magazine, Feb. 1996, pp. 1, 5, 203.
Evans, G., "CEBus Standard User's Guide: A Complete Technical Overview," May 1996, 316 pages.
Dettmer, "GSM Over Ethernet," IEE Review, Mar. 2002, pp. 37-40.
Hachman, M., "Compaq to Ride the CEBus," EBN, Jan. 22, 1996, 1 page.
Trowbridge, D., "High Cost of Wiring Sparks Wireless LAN Alternatives," Computer Technology Review, vol. XIV, No. 3, Mar. 1994, 8 pages.
Hoffman, J., "Cable,Television and the Consumer Electronic Bus," Jun. 11, 1987, pp. 165-173.
Strassberg, D., "Home Automation Buses: Protocols Really Hit Home," EDN, Apr. 13, 1995, 9 pages.
Intel, "54 Mbps IEEE 802.11 Wireless LAN at 2.4 GHz", Nov. 2002, Intel Corp., pp. 1-8.
Unknown, "JVC Introduces Ethernet Compatible Wireless LAN System," Business Wire, Sep. 26, 1995, 1 page.
Unknown, "JVC Introduces First Ethernet Compatible Wireless LAN System," Business Wire, Nov. 7, 1995, 1 page.
JVC Introducing VIPSLAN-10, Sep. 1995, 2 pages.
JVC, "JVC Node," JVC Web Site, Accessed Jan. 18, 2007, 2 pages.
JVC, "JVC PC Card & Mobile," JVC Web Site, Accessed Jan. 18, 2007, 2 pages.
JVC, "JVC Power Hub," JVC Web Site, Accessed Jan. 18, 2007, 1 page.
JVC, "JVC Satellite," JVC Web Site, Accessed Jan. 18, 2007, 2 pages.
JVC, "JVC Station," Web Site, Accessed Jan. 18, 2007, 2 pages.
JVC, "JVC T-Adapter," JVC Web Site, Accessed Jan. 18, 2007,1 page.
JVC, "VIPSLAN-10 Infrared Wireless LAN System," Sep. 1995, 10 pages.
KDI Intigrated Products, "PIN Diode switch SWX-05 from MCE", Nov. 5, 2002, KDI Integrated Products, New Jersey, United States, pp. 1-2.
Markwalter, B. E. et al., "CEBus Router Testing," IEEE Transactions on Consumer Electronics, Nov. 1991, vol. 37, No. 4, 8 pages.
Maxim Intigrated Products, "MAX9993 High Linearity 1700 MHz Down-Conversion Mixer with LO Buffer/Switch", Oct. 2002, pp. 1-12.
Maxim Intigrated Products, Maxim MAX2450 3V, Ultra-Low-Power Quadrate Modulator/Demodulator, Sep. 1998, pp. 1-8.
Unknown, "EIA 600.42 Node Medium Access Control Sublayer," Revision IS-60, Feb. 22, 1996, 54 pages.
Ophir, et al., "802.11 Over Coax—A Hybrid Coax—Wireless Home Networking Using 802.11 Technology," Texas Instruments, Jan. 2004, 6 pages.
Elmirghani, J., "Optical Wireless Systems and Networks," IEEE Communications, vol. 36, No. 12, Dec. 1998, pp. 70-71.
Pahlavan, et al., "Trends in Local Wireless Networks," Communications Magazine, IEEE, Issue 3, vol. 33, Mar. 1995, pp. 88-95.
Unknown, "EIA-600.28 Power Line/RF Symbol Encoding Sublayer," Revision May 12, 1995, Draft Copy, 64 pages.
Powerhouse, "Wireless Remote Controls," Powerhouse Web Site, Accessed Apr. 5, 2005, 3 pages.
Powerhouse, "Wireless Wall Switches," Powerhouse Web Site, Accessed Apr. 5, 2005, 3 pages.
Unknown, "EIA-600.35, RF Physical Layer and Medium Specification," Revision: IS-600, Aug. 30, 1995, 17 pages.
SAWTEK (A TriQuint company), "2441.8 MHz SAW Filter," Oct. 13, 2005, Sawtek, FL, USA, pp. 1-5.
SMSC, "SMSC—Standard Microsystems Corporation, LAN91C111 10/100 Non-PCI Ethernet Single Chip MAC+PHY", Datasheet, Revised Jun. 27, 2011, pp. 1-133.
Unknown, "EIA-600.37, Symbol Encoding Sublayer," Revisions: May 12, 1995, Draft Copy, 30 pages.
Texas Instruments, "Low Power Advantage of 802.11a/g vs. 802.11b", Dec. 2003, Texas Instruments Incorporated, pp. 1-10.
TLSI Incorporated, "T83027 PLL Clock Generator IC with VCXO", Jul. 18, 2005, TLSI Incorporated, NY, USA, pp. 1-6.

(56) References Cited

OTHER PUBLICATIONS

Zyren, J et al. "IEEE 802.11g Offers Higher Data Rates and Longer Range", Mar. 2003, pp. 1-15.
Clegg, "VIPSLAN-10 Streaks Off the Wire," LAN Times, Dec. 18, 1995, 1 page.
JVC, "VISPLAN-10 Infrared Wireless LAN System," JVC, May 1996, 10 pages.
Zeino, et al., Functional Approach to a Hybrid Wireless Network for Mobile Stations, Personal, Indoor and Mobile Radio Communications, 5th IEEE International Symposium, Sep. 18-23, 1994, vol. 3, pp. 994-998.
Non-final Office Action for U.S. Appl. No. 13/664,013 mailed Dec. 20, 2013, 30 pages.
de Valicourt, et al., "Radio-Over-Fiber Access Network Architecture Based on New Optimized RSOA Devices with Large Modulation Bandwidth and High Linearity," IEEE Transactions on Microwave Theory and Techniques, vol. 58, No. 11, Nov. 2010, pp. 3248-3258.
Notification of Reexamination for Chinese patent application 200580014468.5 issued Apr. 24, 2013, 10 pages.
International Preliminary Report on Patentability for PCT/IL2005/000111 mailed Jun. 30, 2006 5 pages.
International Search Report for PCT/IL2005/000111 mailed Jun. 6, 2005, 3 pages.
Translation of Notification of Grounds for Refusal for Korean patent application 10-2006-7025374 mailed May 25, 2011, 2 pages.
Translation of Notification of Grounds for Refusal for Korean patent application 10-2012-7016573 mailed Oct. 23, 2012, 6 pages.
Translation of Official Notice for Filing Response for Korean patent application 10-2012-7016573 mailed Apr. 19, 2013, 2 pages.
Translation of Official Notice for Filing Response for Korean patent application 10-2012-7033432 mailed Apr. 19, 2013, 2 pages.
Translation of Decision on Rejection for Chinese patent application 201110035156.X mailed Aug. 30, 2013, 8 pages.
Translation of Notice on the Second Office Action in counterpart Chinese Patent Application No. 201080006941.6 issued on Nov. 12, 2013, together with Search Report.
Translation of Notice of Grounds for Rejection for Japanese patent application 2011-548833 issued Feb. 25, 2014, 6 pages.

\* cited by examiner

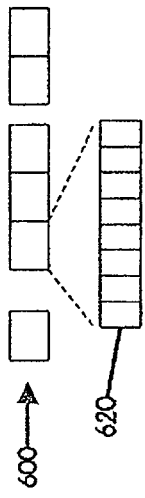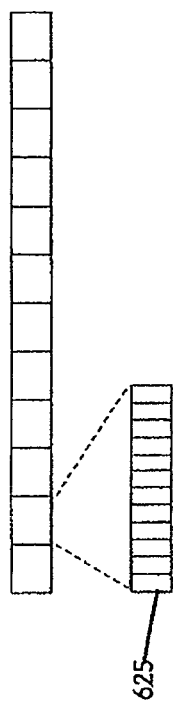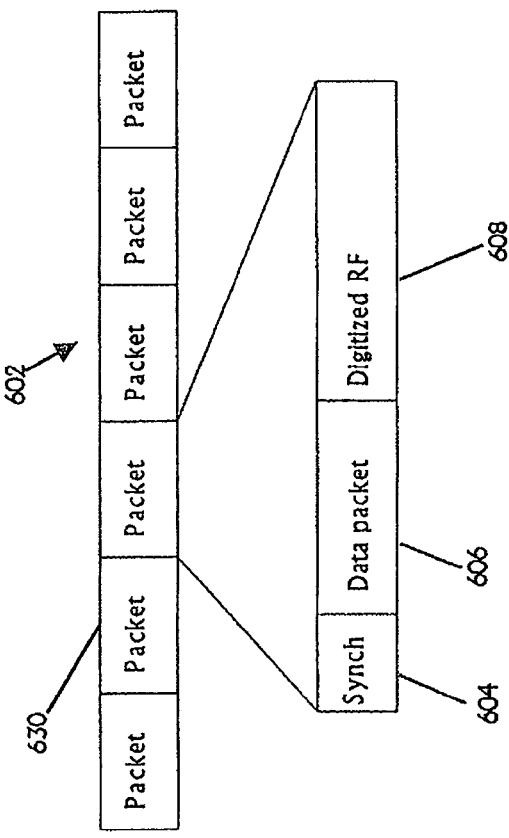
Fig. 4a
Fig. 4b
Fig. 5

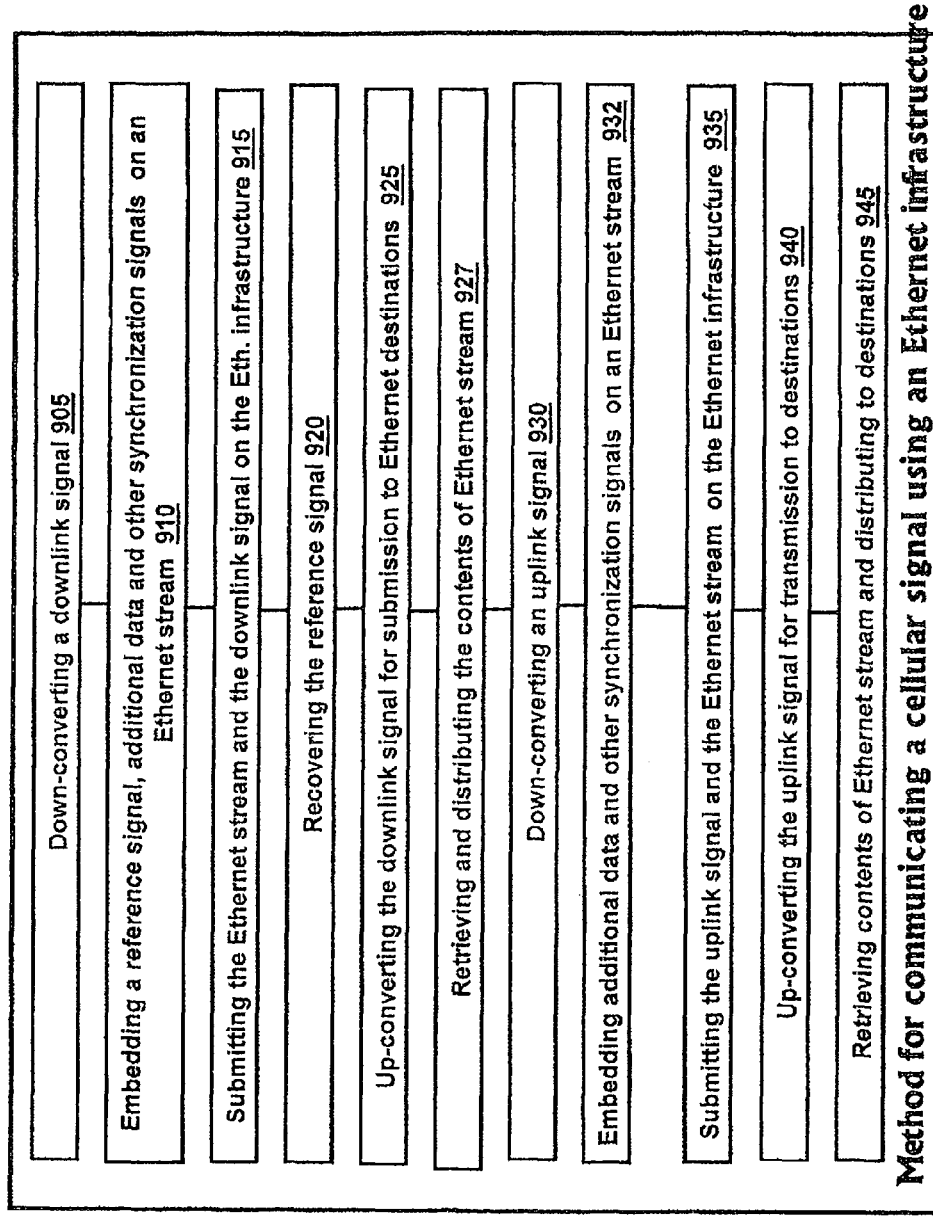

COMMUNICATION SYSTEM USING CABLES CARRYING ETHERNET SIGNALS

RELATED APPLICATIONS

This patent application is a National Stage of PCT/IB2010/050541 filed on Feb. 7, 2010, which claims priority of U.S. Provisional Patent Application No. 61/150,764 filed Feb. 8, 2009, the contents of which are incorporated herein by reference.

BACKGROUND OF THE INVENTION

1. Field of the Invention

The invention is in the field of wireless communication inside buildings, and in particular deals with carrying wireless communication over wiring infrastructure used for Ethernet.

2. Description of Related Art

The invention relates to an In Building (IB) communication system for propagating wireless signals inside buildings using existing wiring infrastructure carrying Ethernet signals.

Several systems and application exist today where cellular or other high frequency signals are propagated through copper wires such as telephone or Ethernet wiring. Since the bandwidth of copper wires is limited, high frequency signals in the frequency bandwidths of cellular communication are not able to propagate through the copper wires without significant attenuation.

In the prior art, illustrated in FIG. 1, the incoming high frequency signal at frequency band $F_1$ is mixed by mixer 104 with the signal of a local oscillator 106 having a frequency $f_2$. The product of the mixer includes several signals at frequency band $F_3$ described by $F_3=\pm F_1 \pm f_2$. A filter 108 at the output of the mixer 104 selects specific frequency band $F_3$ out of the several possible combinations, for example: $F_3=f_2-F_1$. The signals within this frequency band are fed to the copper wires 109 and arrives through it to the remote unit which includes a mixer 112, a local oscillator 114 and a band pass filter 118. The incoming signals at frequency band $F_3$ are mixed at mixer 112 with a signal at frequency $f_5$ produced by local oscillator 114. Filter 118 at the output of mixer 112 selects the required frequency band: $F_6=f_5-F_3$. In order for signals in $F_6$ to be an accurate replica of signals in $F_1$, $f_5$ needs to be exactly the same frequency as $f_2$. Namely, local oscillators 106 and 114 should be locked to the same frequency. To this aim, a reference signal feeds the local oscillator at the Hub unit, and its signal is transferred to the local oscillator at the remote unit for locking it to the same frequency. In the example of FIG. 1, a reference generator 120 located on the hub unit synchronizes local oscillator 106 of the hub unit. A dedicated resource such as physical cable 122 or dedicated bandwidth in cable 109 is used for transferring the reference signal from the reference generator 120 in the hub unit to the remote unit. U.S. Pat. No. 6,157,810 to Georges proposes to transfer between the hub unit and the remote unit a "reference tone" in a "intermediate frequency", which is low enough to be transferred through copper wires.

The approach of the prior art where a special bandwidth is dedicated to the reference signal requires a dedicated special frequency band in the limited bandwidth of the wires and also requires use of a relatively expensive hardware such as sharp band pass filter, mixer in order to filter the reference signal out of the other signals. Moreover, the transfer of reference signal through the cables creates additional interference that might block or degrade other communication channels.

In such systems the hub unit and the remote unit exchange management data that includes indications on the status and operation conditions of electronic circuits in the remote units. This data is generated in the remote units and sent to the hub unit. Management data may also include control messages sent from the hub unit to the remote units for controlling their circuits. Also, other synchronization signals such as a signal synchronizing the receive/transmit state of TDD (Time Division Duplexing) repeaters, need to transferred between the hub unit and the remote unit.

In order to save bandwidth, electronic components and circuits and avoid the need for a dedicated frequency band for the reference signals, management and other data and synchronization signals, it is an objective of the current invention to combine the reference signals, the additional data and the other synchronization signals with a asynchronous Ethernet signal and generate a single synchronized unified data stream used to convey all required signals and synchronize the local oscillators at both sides of the wiring.

BRIEF SUMMARY OF THE INVENTION

It is provided by an embodiment of the current invention, a method for communicating a first signal on Ethernet wiring, the first signal is carried initially over a first frequency band, and the Ethernet wiring has several endpoint devices associated with a wireless device for the first frequency band. The method includes steps associated with a first endpoint device, and steps associated with a second endpoint device. In the first endpoint device, the first signal is converted from being carried over the first frequency band to being carried over a second frequency band, whereas the second frequency band is able to propagate on the Ethernet wiring. Also, a reference signal usable for transforming the wireless signal from the first frequency band to the second frequency band and from the second frequency band to the first frequency band is embedded on an Synchronous Ethernet stream, such that recovery of the reference signal from the Ethernet stream is possible. The Ethernet stream includes Ethernet signals received at the first endpoint device. Consequently, the Ethernet stream and the converted first signal are transferred through the Ethernet wiring to the second endpoint device. There, the reference signal is recovered from the Ethernet stream and is used to shift the first signal from being carried over the second frequency band to being carried on the first frequency band, such that the shifted first signal is transmitted wirelessly over the first frequency band.

In some embodiments, the reference signal is associated in frequency with the first frequency band and with the second frequency band. Actually, a first local oscillator may be used in the converting of the first signal in the first endpoint device, and a second local oscillator may be used in the shifting of the first signal in the second endpoint device, and the first and second local oscillators are synchronized by the reference signal.

In some embodiments, the Ethernet stream is a synchronous Ethernet stream. A first bit rate is used in the received Ethernet signals and a second bit rate is used for the synchronous Ethernet stream. The second bit rate is at least 5% higher than the first bit rate to allow the insertion of additional data.

In some embodiments, the synchronous Ethernet stream includes data for management of electronic circuits located in the second endpoint device, as well as a synchronization signal used thereof.

In some embodiments, a converted replica of the first signal is included in digital format in certain frames of the Ethernet stream.

In some embodiments, the first frequency band is a cellular frequency band operating in one or more multiple access methods like frequency division multiple access (FDMA), code division multiple access (CDMA), time division multiple access (TDMA) and polarization division multiple access (PDMA), and combinations thereof.

In some embodiments, the first endpoint device is a hub unit coupled to a cellular base station or a cellular repeater, and the first signal is a downlink cellular signal. The second endpoint device is a remote unit coupled wirelessly to cellular end-user devices and with Ethernet destinations. An uplink signal is also communicated on the Ethernet wiring, from the remote unit to the hub unit. The uplink signal is carried initially over an uplink frequency band, and in the remote unit, the uplink signal is down-converted to a down-converted uplink frequency band for propagation on the Ethernet wiring. Then, the down-converted uplink signal is submitted on the Ethernet wiring to the hub unit. There, the down-converted uplink signal is up-converted to the uplink frequency band, and is provided to an antenna port of the cellular base station or the cellular repeater. The uplink frequency band and the down-converted uplink frequency band are associated by the reference signal.

It is provided according to some embodiments of the present invention, a hub unit for transmitting a first wireless signal on an Ethernet infrastructure to remote units. The hub unit and each remote unit are associated with at least one wireless device for a first frequency band, and the first signal is carried initially over the first frequency band. The system includes a frequency conversion section and a packet synchronizer. The frequency conversion section is adapted for converting the first signal from being carried over the first frequency band to being carried over a second frequency band, for propagation on the Ethernet wiring. The packet synchronizer is adapted for combining into a single Synchronous Ethernet stream a reference signal associating the first frequency band and the second frequency band, and Ethernet signals received at the first endpoint device. The reference signal is recoverable from the single synchronous Ethernet stream.

The single synchronous Ethernet stream and the converted first signal are submitted on the Ethernet wiring, and upon arriving a remote unit, the reference signal is recovered from the single Synchronous Ethernet stream, and the converted first signal is shifted from being carried over the second frequency band to being carried over the first frequency band, and the shifted first signal is wirelessly transmitted over the first frequency band.

In some embodiments, the frequency conversion section includes a local oscillator for generating a signal synchronized with the reference signal, a mixer for receiving the local oscillator signal and the first signal and generating a plurality of sum and difference signals, and a filter for selecting an appropriate signal from the plurality of sum and difference signals.

It is provided according to some embodiments of the present invention, a remote unit in a cellular system associated with an Ethernet wiring. The remote unit receives downlink signal from a hub unit for transmission to cellular end-user devices, and the remote unit transfers an uplink signal received from the cellular end-user devices to the hub unit. The hub unit and the remote unit are associated with wireless devices for uplink and downlink wireless frequency bands. The uplink signal is carried initially over the wireless uplink frequency band. The remote unit includes a packet opener, a digital phase-locked loop, and a frequency conversion section.

The packet opener receives a synchronous Ethernet stream from the hub unit, and provides a signal in a frequency associated with the data rate of the synchronous Ethernet stream to the digital phase-locked loop. The digital phase-locked loop receives the provided signal and extracts a reference signal. The frequency conversion section converts the uplink signal from being carried over the wireless uplink frequency band to being carried over a down-converted uplink frequency band, able to propagate on the Ethernet wiring. The uplink frequency band and the down-converted uplink frequency band are associated by the reference signal.

The down-converted uplink signal is submitted on the Ethernet wiring, and upon arriving the hub unit, the down-converted uplink signal is up-converted from being carried over the down-converted uplink frequency band to being carried on the uplink frequency band, for providing to a wireless device.

In some embodiments, the hub unit submits a synchronous Ethernet stream, and the remote unit further includes an Ethernet packet rebuilder and a packet synchronizer. The Ethernet packet rebuilder receives from the packet opener the contents of the synchronous Ethernet stream, and generates asynchronous Ethernet signals having the contents of the synchronous Ethernet stream for submission to Ethernet destinations. The packet synchronizer receives asynchronous Ethernet signals from an Ethernet source, and generates a synchronous Ethernet stream having the contents of the asynchronous Ethernet signals. The packet synchronizer may also receive data items like wireless data from a wireless local area network, management data that includes indications on the status and operation conditions of the electronic circuits in the remote units and control messages sent from the hub unit to the remote units for controlling their circuits, synchronization data from a synchronization source, and include the received data items in the generated synchronous Ethernet stream.

BRIEF DESCRIPTION OF THE DRAWINGS

The subject matter regarded as the invention is particularly pointed out and distinctly claimed in the concluding portion of the specification. The invention, however, both as to system organization and method of operation, together with features and advantages thereof, may best be understood by reference to the following detailed description when read with the accompanied drawings in which:

FIG. 4a shows asynchronous Ethernet signals having eight bits per packet.

FIG. 4b shows a synchronous Ethernet stream having ten bits per packet.

FIG. 5 shows a synchronous Ethernet stream with an embedded digital signal carrying a portion of a wireless signal in a digitized RF (radio frequency) format.

FIG. 9 is a flowchart of a method for communicating cellular signals using an Ethernet wiring.

DETAILED DESCRIPTION OF THE INVENTION

Figure 1:
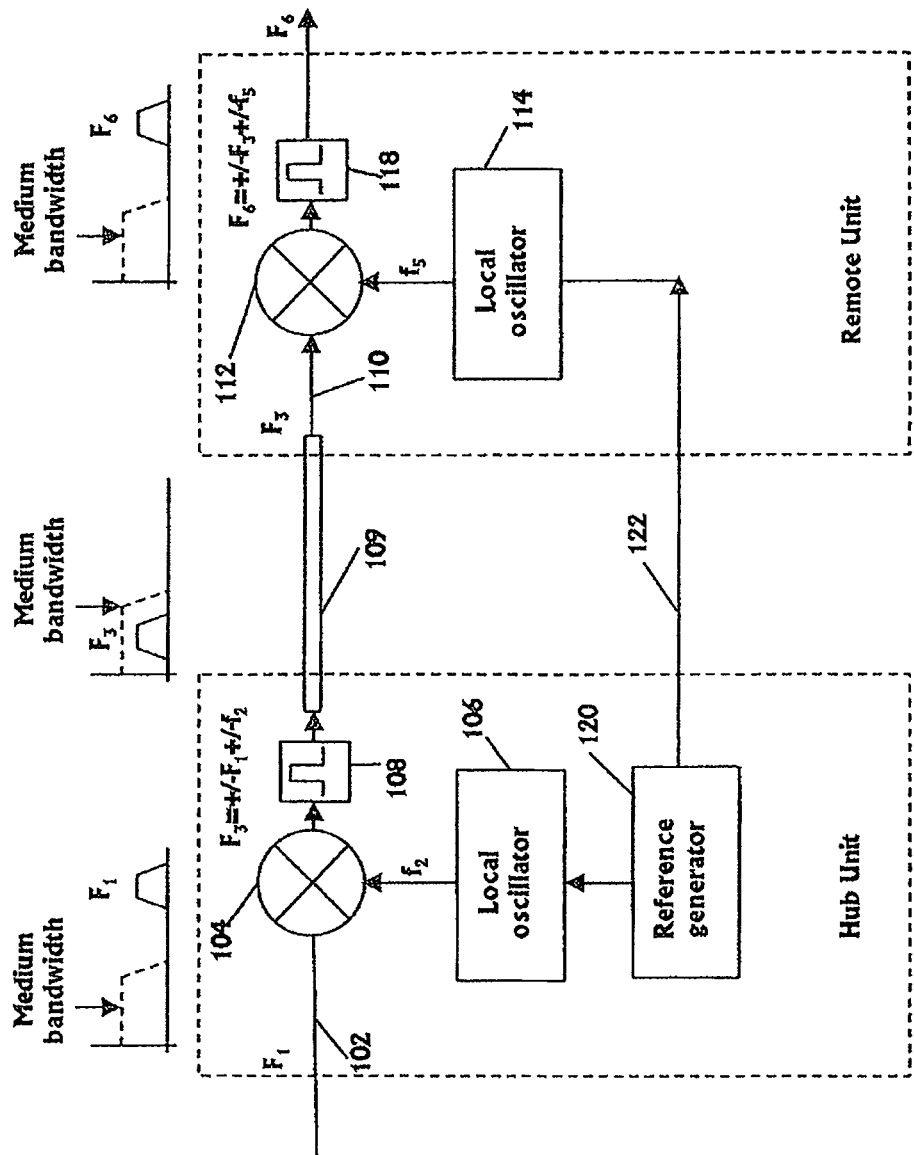
FIG. 1 (prior art) is a block diagram of a system for delivering wireless signals over Ethernet wiring according to the prior art.

The present invention will now be described in terms of specific example embodiments. It is to be understood that the invention is not limited to the example embodiments disclosed. It should also be understood that not every feature of the methods and systems handling the described wireless and Ethernet communications is necessary to implement the invention as claimed in any particular one of the appended claims. Various elements and features of devices are described to fully enable the invention. It should also be understood that throughout this disclosure, where a method is shown or described, the steps of the method may be performed in any order or simultaneously, unless it is clear from the context that one step depends on another being performed first.

Before explaining several embodiments of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

Unless otherwise defined, all technical and scientific terms used herein have the same meaning as commonly understood by one of ordinary skill in the art to which this invention belongs. The systems, methods, and examples provided herein are illustrative only and not intended to be limiting.

In the description and claims of the present application, each of the verbs "comprise", "include" and "have", and conjugates thereof, are used to indicate that the object or objects of the verb are not necessarily a complete listing of members, components, elements or parts of the subject or subjects of the verb.

Although the term Ethernet is used in this description, the same principle, methods and circuits can be used with other types of packet data protocols, and the claimed invention include other packet data protocols. Although the term Ethernet wiring is used in this description, it may be replaced by wiring infrastructure used for delivering other types of signals.

Figure 2:
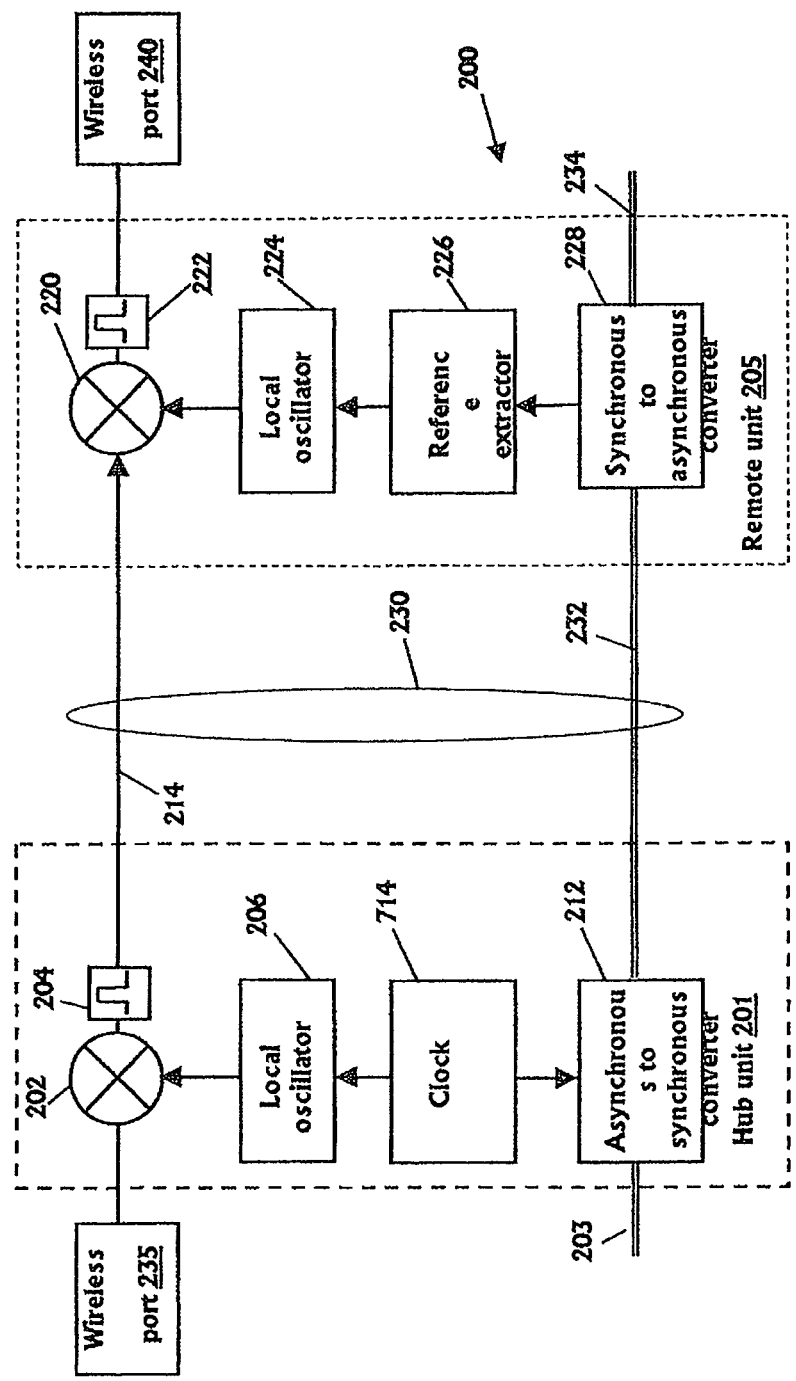
FIG. 2 illustrates delivering of a reference signal embedded in an Synchronous Ethernet stream over the Ethernet wiring.

FIG. 2 shows a block diagram of an embodiment of a system 200 for transferring wireless signals in RF (radio frequency) between wireless port 235 associated with a hub unit 201 and a wireless port 240 associated with a remote unit 205. Hub unit 201 and remote unit 205 are coupled electrically by wiring 230. Wiring 230 is usually a cable which includes several pairs of copper wires, some or all of them may carry Ethernet signals. For the sake of simplicity, FIG. 2 shows an implementation where the RF shifted signal is transferred over a dedicated wires 214 of an Ethernet cable 230. However, the RF shifted signal may be transferred over one of the wire pairs 232 used simultaneously also for transferring the Ethernet signal.

Hub unit 201 includes a mixer 202, a band pass filter 204, a local oscillator 206, a clock 714 and an asynchronous to synchronous converter 212, interconnected as shown. Remote unit 205 includes a conversion mixer 220, a band pass filter 222, a local oscillator 224, a reference extractor 226 and a synchronous to asynchronous converter 228, interconnected as shown.

Clock 714 is used as a reference signal for local oscillator 206 and also synchronizes the Ethernet packets at the asynchronous to synchronous converter 212.

The asynchronous Ethernet signal in the hub unit to remote unit direction enters hub unit 201 at port 203. Asynchronous to synchronous converter 212 converts the asynchronous Ethernet signal to synchronous Ethernet signal, synchronized by clock 714.

Reference extractor 226 is used to extract the reference signal from the synchronous Ethernet signal, using a digital phase-locked loop (PLL), for example. The extracted reference signal may be used as a reference signal to local oscillator 224. For example, a frequency synthesizer may be used to synthesize the frequency of local oscillator 224 from the reference signal. Since the reference signals of local oscillators 206 and 224 are derived from the same source, the frequency of the two local oscillators may be made to be identical.

Local oscillator 224 at the remote unit produces a signal at a frequency $f_5$ based on the reference signal arriving from reference extractor 226. Mixer 220 is used for up-conversion of the signals in frequency band $F_3$ to frequency band $F_6$. Band pass filter 222 at the output of mixer 220 selects the frequency band $F_6=f_5-F_3$. Since the frequency of the reference signal at the output of reference extractor 226 is identical to the frequency of the clock signal, both local oscillators 224 and 206 are synchronized on an identical frequency. As a result, the $F_6$ band becomes an accurate replica of the $F_1$ band. That is, each signal in the $F_1$ band returns exactly to its original frequency in the $F_6$ band. The same principles may be used with multiple remote units. Furthermore, the same principles may be used where $F_1$ represents multiple frequency bands, whereas $F_3$ and $F_6$ also represent multiple frequency bands. Asynchronous to synchronous converter 212, synchronous to asynchronous converter 228 and reference extractor 226 may be implemented using a FPGA (field programmable gate array) or ASIC (application specific integrated circuit) technologies.

Figure 3:
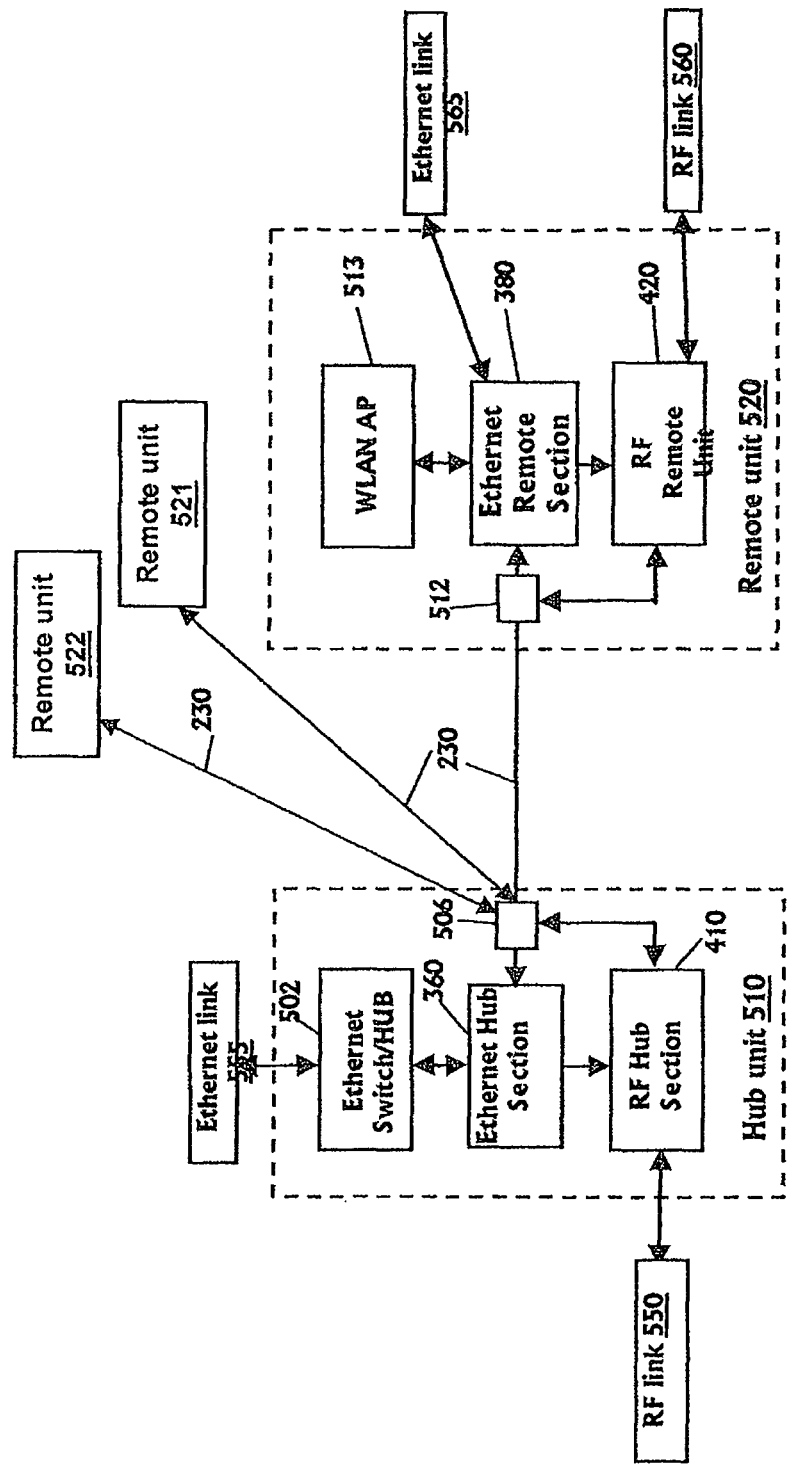
FIG. 3 is a block diagram of a combined Ethernet/wireless system.

To get a broader view of the combined Ethernet and wireless communication system served by embodiments of the current invention, reference is now made to FIG. 3. It shows a hub unit 510 and a remote unit 520 used for serving cellular propagation and optionally also WLAN (wireless local area network) service 513. Hub 510 is connected on one hand to RF link 550 and to Ethernet link 555, and on the other hand to several remote units 520, 521 and 522. An exemplary RF link 550 is a cellular base station. An exemplary Ethernet link is a modem connected to the INTERNET. Each of the remote units 520, 521 and 522 is connected to an RF link 560 and to Ethernet link 565. Remote unit 520 is connected to or includes a WLAN AP (access point) 513 internally connected to Ethernet remote section 380. The WLAN AP is used for providing WLAN service. Exemplary technologies that can be used for WLAN are Wi-Fi, based on IEEE 802.11 standards and BLUTOOTH™ based on IEEE 802.15 standards.

In hub unit 510, Ethernet hub/switch 502 is linked to external Ethernet link 555, feeding Ethernet hub section 360 with Ethernet signals destined to Ethernet link 565 or to the WLAN AP 513. Ethernet hub section 502 provides a reference signal to RF hub section 410, which gets RF signals from RF link 550. RF hub section 410 down-converts the RF signal, generating a signal which is capable propagating on the Ethernet wiring. Ethernet hub section 360 embeds the reference signal into the Ethernet signal, which is submitted through separator/combiner 506 to Ethernet wiring 230 together with the down-converted RF signal provided by the RF hub section 410. Separator/combiner 506 and 512 include filters in the frequency bands of the required wireless and Ethernet signals.

In remote unit 520, separator/combiner 512 separates the Synchronous Ethernet stream from the down-converted RF signal and provides the Synchronous Ethernet stream and the down-converted. RF signal to Ethernet remote section 380 and RF remote unit 420, respectively. Ethernet remote section 380 extracts the reference signal from the Synchronous Ethernet stream and provides the reference signal to RF remote unit 420 for up-converting the RF signal, which is sent in turn to RF link 560.

The Ethernet signal at Ethernet link 555 and Ethernet link 565 are asynchronous Ethernet packets 600 as illustrated in FIG. 4a, arriving at arbitrary arrival times as determined by senders and having different signal lengths within a predetermined range of the communication standard. Ethernet hub section 360 and Ethernet remote section 380 convert the Ethernet signals received in an asynchronous mode to a synchronous Ethernet stream in which the reference signal is embedded together with the additional data, management and other synchronization signals. To enable additional content, the bit rate is increased. In the example of FIG. 4a, there are eight bits in each packet 620 of the asynchronous Ethernet signals, while a packet 625 of the same total length of the synchronous Ethernet stream 602 includes 10 bits, being 25% denser.

In some embodiments, a converted replica of the RF signal is embedded in digitized format in the synchronous Ethernet stream as illustrated in FIG. 5, whereas Synchronous Ethernet stream 602 is a continuous stream of equal length packets 630, able to carry digitized RF signal 608 in addition to packet data 606 and synchronization signal 604.

Preferably, the packet rate or the bit rate of the synchronous Ethernet stream 602 may be used as the reference signal, having a rational relation with the frequency of the local oscillators 206 and 224. For example: assume that a clock 714 with a reference signal of 10 MHZ is used. This reference signal is then provided as a reference signal to a frequency synthesizer that uses it to create the local oscillator 206 signal. Assume that the frequency of the local oscillator 206 is required to be 755 MHz. In this case the frequency synthesizer divides the 10 MHz reference signal by 10, creating an 1 MHz signal and then multiply it by 755 for generating a 755 MHz signal. The asynchronous to synchronous converter will use the 10 MHz reference signal in order to create a 10 Mega packets per second synchronous Ethernet stream. The reference extractor 226 will extract a 10 MHz reference signal out of 10 Mega packets per second data stream. The 10 MHz signal is then provided as a reference signal to a frequency synthesizer that uses it for creating a signal of local oscillator 224. In this case the frequency synthesizer divides the 10 MHz reference signal by 10, creating an 1 MHz signal and then multiply it by 755, generating a 755 MHz signal.

Figure 6:
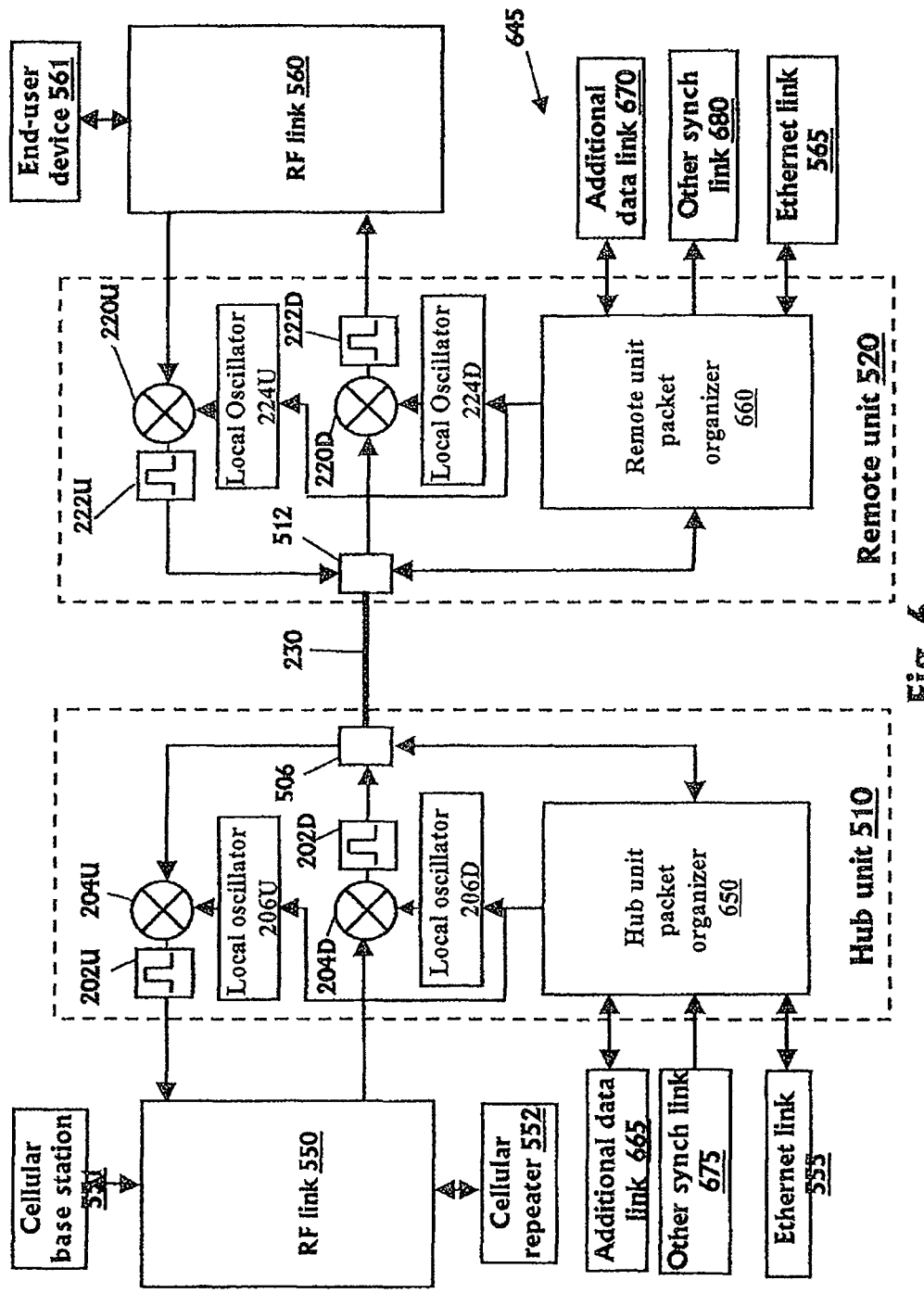
FIG. 6 is a block diagram of a hub unit and a remote unit for communicating Synchronous Ethernet streams and wireless signals in both uplink and downlink directions.

Note that in wireless cellular communications full duplex capability is obtained using one frequency band for downlink signals from a cellular base station to end-user devices, and a different frequency band for uplink signals from end-user devices to the cellular base station. FIG. 6 illustrates a system 645 implementing the full duplex capability according to the present invention. The following description deals first with downlink transmission and then with uplink transmission.

A downlink cellular signal, sent from RF link 550 coupled to a cellular base station 551 or to a cellular repeater 552, is received in hub unit 510 and is mixed in mixer 204D with a mixing signal from local oscillator 206D. Local oscillator 206D receives a reference signal from a clock inside a hub unit packet organizer 650. The signal from mixer 204D is fed into filter 202D which selects a predetermined down converted frequency band appropriate for propagation over Ethernet bundle 230. Hub unit packet organizer 650 receives also Ethernet signals from Ethernet link 555, additional data from link 665, and synchronization signals from link 675, all signals being combined, in synchronization with the reference signal, into a single unified synchronous Ethernet stream.

The Synchronous Ethernet stream and the down converted downlink cellular signals are combined together in separator/combiner 506 for transmission over Ethernet wiring 230. In remote unit 520, the synchronous Ethernet stream is separated by separator/combiner 512 and is fed into a remote unit packet organizer 660. There, the synchronous Ethernet stream is decomposed and each of Ethernet link 565, additional data link 670 and other synchronization link 680 gets its respective signal. Also, the reference signal is extracted from the Synchronous Ethernet stream and fed into local oscillator 224D, which submits a mixing signal to mixer 220D, where it is mixed with the down-converted downlink cellular signal arriving from separator/combiner 512. Finally, filter 222D selects a predetermined downlink band from the output of mixer 220D and provides it to RF link 560 for transmission to the end user devices 561.

An uplink cellular signal, originated by end-user devices 561 through RF link 560 is received in the remote unit 520 and is mixed in mixer 220U with a mixing signal provided by the local oscillator 224U. Local oscillator 224U receives a reference signal extracted by the remote unit Packet Organizer 660 from the incoming Synchronous Ethernet stream arriving from hub unit 510. The signal from mixer 220U is fed into filter 222U which selects a predetermined down converted signal appropriate for propagation over Ethernet bundle 230. Remote unit packet organizer 660 receives Ethernet signals from Ethernet link 565, additional data from link 670, and additional synchronization signals from link 680, all signals being combined into a single unified synchronous Ethernet stream, in synchronization with the reference signal that was extracted from the downlink synchronous Ethernet signal.

The Synchronous Ethernet stream and the down converted uplink cellular signals combine together in separator/combiner 512 for transmission over Ethernet bundle 230 to hub unit 510. In hub unit 510, the synchronous Ethernet stream is separated by separator/combiner 506 and is fed into hub unit Packet Organizer 650. There, the Synchronous Ethernet stream is decomposed and each of Ethernet link 555, additional data link 6665 and other synchronization link 675 gets its respective signal. The clock in packet organizer 650 feeds local oscillator 206U which submits a mixing signal to mixer 204U, where it is mixed with the down-converted uplink cellular signal arriving from separator/combiner 506. Finally, filter 202U selects a predetermined up-conversion frequency band from the output of mixer 204U and provides it to RF link 550 for transmission to cellular base station 551 or cellular repeater 552.

An example for the use of additional data link 670 is serving a WLAN AP 513, which receives data sent form the Hub unit 510 and sends back data to the hub unit 510. Also, an example for the use of another synchronization link 560 is switching of a TDD (Time Division Duplexing) amplifier which needs to be switched between uplink and downlink operation states. Also, additional data may include indications on the status and operation conditions of the electronic circuits in the remote units. As mentioned, the additional data and the synchronization signals are been embedded in the Synchronous Ethernet stream delivered between hub unit 510 and remote unit 520 and vice versa.

Figure 7:
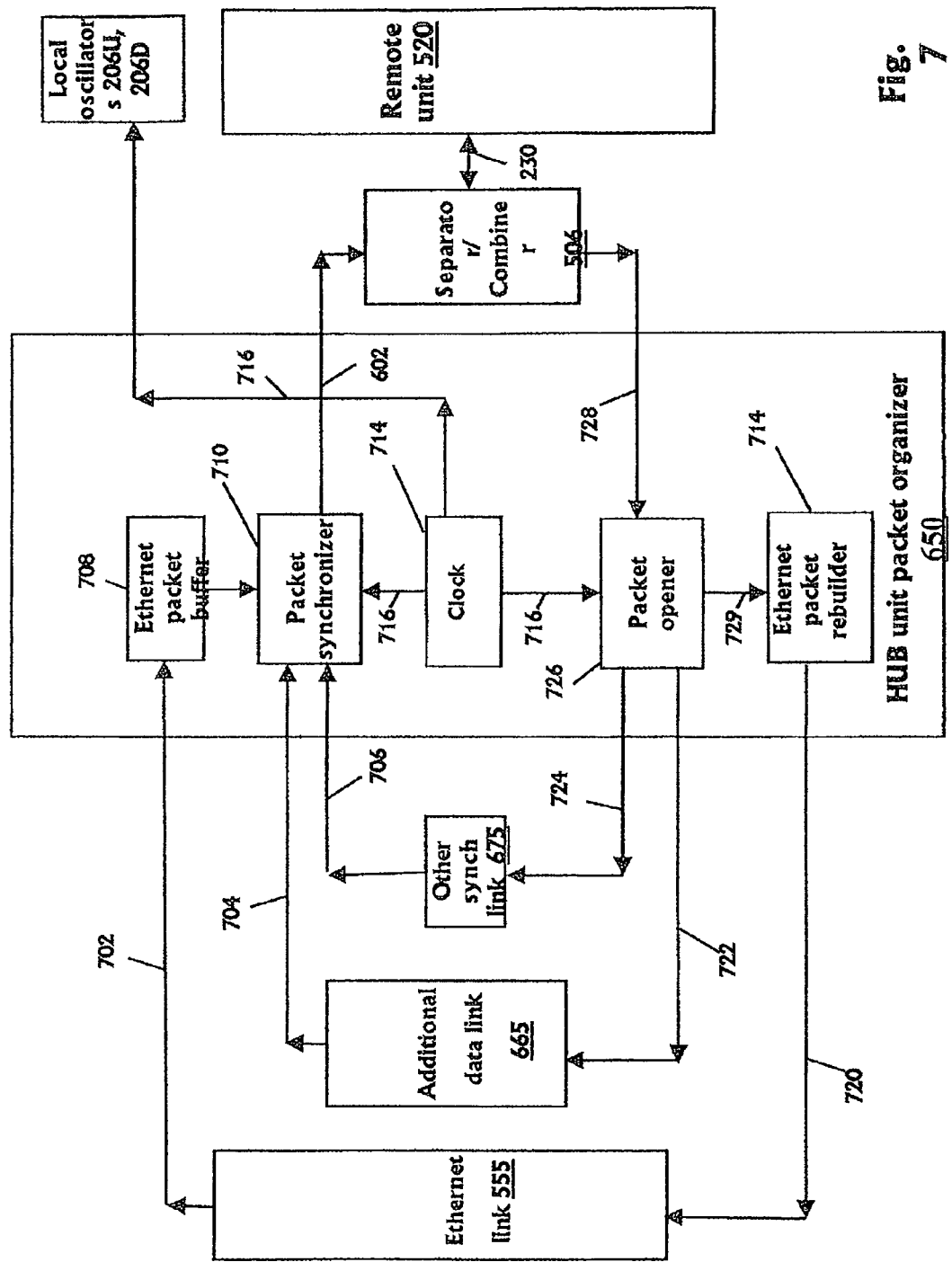
FIG. 7 is a block diagram of a hub unit packet organizer.
Figure 8:
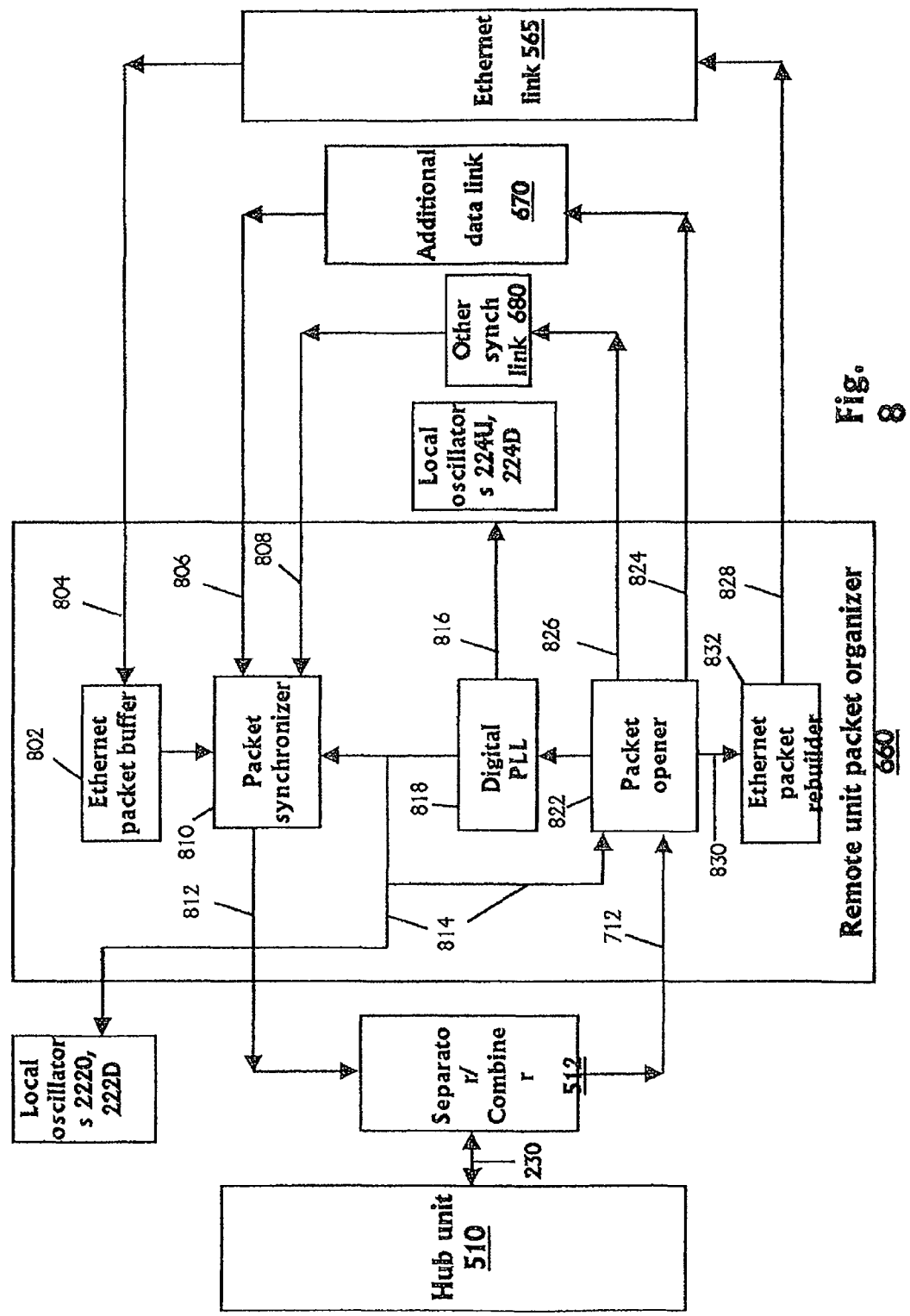
FIG. 8 is a block diagram of a remote unit packet organizer.

FIG. 7 and FIG. 8 show internal structures of hub unit packet organizer 650 and of remote unit packet organizer 660, respectively, for performing tasks of the packet organizers as described in reference to FIG. 6.

In hub unit packet organizer 650 of FIG. 7, asynchronous Ethernet packets 702 are fed into Ethernet packet buffer 708. A packet synchronizer 710 pulls the packets from Ethernet packet buffer 708 in appropriate times and inserts them into a synchronous packet stream 602. The additional data 704 and other synchronization signals 706 are also fed into packet synchronizer 710. Packets synchronizer 710 arranges the Ethernet packets 702, the additional data 704 and other synchronization signals 706 into a unified synchronous Ethernet stream 602. That stream has a synchronous data structure composed of continuous stream of equal duration packets having a bit rate higher then the bit rate of Ethernet packets 600 or 702. Clock 714 provides a reference signal 716 to packet synchronizer 710, and thus stream 602 is synchronized with clock 714. Single synchronous unified data stream 602 is provided to separator/combiner 506 and then transmitted to remote unit 520 via Ethernet wiring 230. Note that clock signal 716 is also used by hub unit local oscillators 206U, and 206D.

Synchronous Ethernet stream 728 arrives from remote unit 520 through separator/combiner 506, and fed to a packet opener 726 receiving a reference signal 716 from clock 714 for assisting the process of synchronization on the pattern of the synchronous Ethernet stream 728. Packet opener 726 retrieves, out of the synchronous Ethernet stream 728, Ethernet high data rate packets 729, additional data 722 and other synchronization signals 724. Ethernet packets rebuilder 718 converts the Ethernet high data packets 729 to asynchronous lower data rate Ethernet signals 720, sent to Ethernet link 555.

In remote unit packet organizer 660 of FIG. 8, a synchronous Ethernet stream 712, arriving from hub unit 510 through separator/combiner 512, is fed to a packet opener 822. Packet opener 822 retrieves the repeating pattern of the synchronous Ethernet stream 712 and provides it to the digital PLL 818. In addition, it retrieves the Ethernet data 830, additional data 824 and other synchronization signals 826. Digital PLL 818 recovers the clock signal out of the rate of the synchronous Ethernet stream provided by the packets opener 822 and filters out the residual jitter. Ethernet packets rebuilder 832 converts the Ethernet high data packets 830 to asynchronous lower data rate Ethernet signals 828, sent to Ethernet link 565.

The recovered clock signal 814 generated at digital PLL 818 is fed back to the packet opener 822, assisting the process of synchronization on the pattern of the synchronous Ethernet stream 712.

Ethernet asynchronous packets 804 are fed into Ethernet packet buffer 802. A packet synchronizer 810 pulls the packets from Ethernet packet buffer 802 in appropriate times and inserts them into a new packet stream or synchronous Ethernet stream 812. The additional data 806 and other synchronization signals 808 are also fed into the new packets organizer 810. Packet synchronizer 810 arranges the Ethernet packets 804, the additional data 806 and other synchronization signals 808 into synchronous Ethernet stream 812. Stream 812 has a synchronous data structure composed of continuous stream of equal duration packets having a bit rate higher then the bit rate of the original Ethernet packets 804. The digital PLL 818 provides recovered clock signal 814 used as a synchronization signal to packet synchronizer 810, and thus stream 812 is synchronized with clock 714. Synchronous Ethernet stream 812 is provided to separator/combiner 512 and then transmitted to hub unit-510 via Ethernet wiring 230. Note that the recovered clock signal 814 is also used by remote unit local oscillators 220U, and 222D for down-converting and up-converting, respectively, the uplink and downlink cellular signals.

Before referring to method 900 of FIG. 9, main features of the invention are reproduced here, based on the description of FIGS. 2-9.
1) A synchronous Ethernet stream which comprises all necessary "additional data, synchronization and the received Ethernet signals" is created. The hub unit and the remote unit exchange management data that includes indications on the status and operation conditions of electronic circuits in the remote units. This data is generated in the remote units and sent to the hub unit. Management data may also include control messages sent from the hub unit to the remote units for controlling their circuits.
2) At the hub unit the synchronous Ethernet stream is synchronized by a clock signal being the origin of a reference signal for the hub and the remote units.
3) At the remote unit, the synchronous Ethernet stream is synchronized by the recovered reference signal.
4) At the remote units the reference signal is recovered from the synchronous Ethernet stream using packet opener and digital PLL.
5) At the hub unit the reference signal is used as a reference for frequency synthesizers that feeds the up and down converters used to down-convert the downlink signal and up-convert the uplink signal.
6) At the remote units the recovered reference signal is used as a reference for frequency synthesizers that feeds the up and down converters used to down convert the uplink signal and up convert the downlink signal. Due to the accurate reconstruction of the reference signal at the remote units, the frequency of the recovered reference signal at the remote unit is identical to the frequency of the reference signal at the hub unit and therefore the downlink wireless signal can be accurately reconstructed at the remote units and the uplink wireless signal can be accurately reconstructed at the hub unit.
7) All other necessary "additional data, synchronization and received Ethernet signals" are provided to their respective links at each side after being retrieved by the packet opener at that side.

Reference is now made to FIG. 9 which illustrates a flow chart of a method 900 for communicating a first signal on Ethernet wiring, the first signal is carried initially over a first frequency band, and the Ethernet wiring has several endpoint devices associated with a wireless device for the first frequency band. Method 900 includes steps associated with a first endpoint device, and steps associated with a second endpoint device. In the first endpoint device, the first signal is down converted 905 from being carried over the first frequency band to being carried over a second frequency band. The second frequency band is able to propagate on the Ethernet wiring. Also, a reference signal associated with the first frequency band and with the second frequency band is embedded 910 on a synchronous Ethernet stream, such that recovery of the reference signal from the synchronous Ethernet stream is possible. The synchronous Ethernet stream includes Ethernet signals received at the first endpoint device, as well as additional data and other synchronization signals. Then, the synchronous Ethernet stream and the converted first signal are submitted 915 on the Ethernet wiring. In the second endpoint device, the reference signal is recovered 920 from the synchronous Ethernet stream and is used for synthesizing the signal used for up-converting 925 the first signal back to the first frequency band, such that the up-converted first signal is transmitted wirelessly over the first frequency band.

Also, the contents of the synchronous Ethernet stream, the Ethernet signals, additional data and other synchronization signals, are retrieved and distributed 927 to their respective destinations.

In some embodiments, the first endpoint device is a hub unit 510 coupled to a cellular base station 551 or cellular repeater 552, and the first signal is, a downlink cellular signal. The second endpoint device is a remote unit 520 associated with cellular end-user devices 561 and with Ethernet destinations 565. An uplink signal is also communicated on the Ethernet wiring, from remote unit 520 to hub unit 510. The uplink signal is carried initially over an uplink frequency band, and in the remote unit, the uplink signal is down-converted 930 to a down-converted uplink frequency band which is able to propagate on the Ethernet wiring. The uplink frequency band and the down-converted uplink frequency band are associated by the reference signal delivered over the Ethernet wiring by the synchronous Ethernet stream from hub unit 510 to remote unit 520. Also, additional data and other synchronization signal are embedded 932 on a synchronous Ethernet stream. Then, the down-converted uplink signal is submitted 935 on the Ethernet wiring to hub unit 510. There, the down-converted uplink signal is up-converted 940 to the uplink frequency band, and is coupled to cellular base station 551 or to a cellular repeater 552. Also, contents of the Synchronous Ethernet stream from the hub unit are retrieved 945 and distributed to destinations in the hub side.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. In particular, the present invention is not limited in any way by the examples described.

The invention claimed is:

1. A method for communicating a first signal on a wiring infrastructure, the first signal being carried initially over a first frequency band, the wiring infrastructure having two or more endpoint devices, each endpoint device being associated with a wireless device for the first frequency band, the method comprising:
   in a first endpoint device of the two or more endpoint devices,
   (a) converting the first signal from being carried over the first frequency band to being carried over a second frequency band, said second frequency band being able to propagate on the wiring infrastructure;
   (b) embedding a reference signal on a synchronous Ethernet packet stream, said reference signal being usable for transforming the wireless signal from the first frequency band to the second frequency band and from the second frequency band to the first frequency band, said reference signal being recoverable from said packet stream; and
   (c) submitting said packet stream and said converted first signal on the wiring infrastructure;
   and in a second endpoint device of the two or more endpoint devices,
   (d) recovering said reference signal from said packet stream; and
   (e) using the recovered reference signal for transforming said first signal from being carried over said second frequency band to being carried on said first frequency band, wherein the converted first signal is included in digital format in certain frames of said packet stream;

wherein:
   the first endpoint device is a hub unit associated to a cellular base station or to a cellular repeater, the first signal is a downlink cellular signal, and the second endpoint device is a remote unit associated with cellular end-user devices and with Ethernet destinations;
   an uplink signal is transferred from said remote unit to said hub unit on said wiring infrastructure, said uplink signal is carried initially over an uplink frequency band, the uplink signal is communicated transferred by,
   in said remote unit,
      (i) down-converting said uplink signal from being carried over said uplink frequency band to being carried over a down-converted uplink frequency band, said down-converted uplink frequency band being able to propagate on the wiring infrastructure, said uplink frequency band and said down-converted uplink frequency band being associated by said reference signal; and
      (ii) submitting said down-converted uplink signal on the wiring infrastructure; and
   in said hub unit,
      (iii) up-converting said down-converted uplink signal from being carried over said down-converted uplink frequency band to being carried over said uplink frequency band, thereby providing the up-converted uplink signal to the cellular base station or cellular repeater.

2. The method of claim 1, wherein the reference signal is associated in frequency with said first frequency band and with said second frequency band.

3. The method of claim 1, wherein a first local oscillator is used in said converting of said first signal in said first endpoint device, and a second local oscillator is used in said transforming of said first signal in said second endpoint device, the first and second local oscillators are synchronized by said reference signal.

4. The method of claim 1, wherein a first bit rate is used in received Ethernet signals received without said synchronous Ethernet stream and a second bit rate is used for said synchronous Ethernet stream, said second bit rate is at least 5% higher than said first bit rate.

5. The method of claim 1, wherein said packet stream further includes data for management of electronic circuits installed in said second endpoint device.

6. The method of claim 1, wherein said packet stream further includes synchronization signal for electronic circuits installed in said second endpoint device.

7. The method of claim 1, wherein the first frequency band is a cellular frequency band operating in one or more access methods selected from a group of multiple access methods consisting of frequency division multiple access, code division multiple access, time division multiple access and polarization division multiple access, and combinations thereof.

8. A hub unit for transmitting a first wireless signal on an Ethernet infrastructure to at least one remote unit, the hub unit and the at least one remote unit being associated with a wireless device for a first frequency band, the first signal being carried initially over a first frequency band, the hub unit being associated with a cellular base station or a cellular repeater, and the first signal being a downlink signal, the system comprising:
   (a) a frequency conversion section adapted for converting the first signal from being carried over the first frequency band to being carried over a second frequency band, said second frequency band being able to propagate on the Ethernet wiring; and (b) a packet synchronizer adapted for combining into a single Synchronous Ethernet stream at least a reference signal associating said first frequency band and said second frequency band, and Ethernet signals received at the first endpoint device, said reference signal being embedded in and recoverable from said single Synchronous Ethernet stream;

whereby said single synchronous Ethernet stream and said converted first signal being submitted on the Ethernet infrastructure, and upon arriving at the at least one remote unit, said reference signal being recovered from said single Synchronous Ethernet stream, and the converted first signal being shifted from being carried over said second frequency band to being carried over said first frequency band, the shifted first signal being wirelessly transmitted over said first frequency band, wherein said frequency conversion section includes:
(i) a local oscillator for generating a signal synchronized with said reference signal;
(ii) a mixer for receiving said signal and said first signal and generating a plurality of sum and difference signals; and
(iii) a filter for selecting an appropriate signal from said plurality of sum and difference signals;

wherein the at least one remote unit is further configured to transfer an uplink signal to said hub unit on said Ethernet infrastructure, said uplink signal is carried initially over said first frequency band, the uplink signal is communicated transferred by:

in said remote unit,
(i) down-converting said uplink signal from being carried over said first frequency band to being carried over said second frequency band, said second frequency band being able to propagate on the Ethernet infrastructure, said first frequency band and said second frequency band being associated by said reference signal; and
(ii) submitting said down-converted uplink signal on the Ethernet infrastructure; and in said hub unit,
(iii) up-converting said down-converted uplink signal from being carried over said second frequency band to being carried over said first frequency band, thereby providing the up-converted uplink signal to the cellular base station or cellular repeater.

9. The hub unit of claim 8, wherein said single Synchronous Ethernet stream is a synchronous Ethernet stream.

10. The hub unit of claim 9, wherein the bit rate of said synchronous Ethernet stream is at least 5% higher from respective bit rates of received Ethernet signals received without said synchronous Ethernet stream.

11. The hub unit of claim 9, wherein said packet synchronizer is adapted to embed in digital form a replica of said first signal into frames of said synchronous Ethernet stream.

* * * * *